(12) United States Patent
Orr

(10) Patent No.: US 11,891,984 B2
(45) Date of Patent: Feb. 6, 2024

(54) WIND TURBINE APPARATUS

(71) Applicant: Declan Orr, Letterkenny (IE)

(72) Inventor: Declan Orr, Letterkenny (IE)

(73) Assignee: Declan Orr, Letterkenny (IE)

( * ) Notice: Subject to any disclaimer, the term of this patent is extended or adjusted under 35 U.S.C. 154(b) by 90 days.

(21) Appl. No.: 17/773,394

(22) PCT Filed: Oct. 31, 2019

(86) PCT No.: PCT/EP2019/079936
§ 371 (c)(1),
(2) Date: Apr. 29, 2022

(87) PCT Pub. No.: WO2021/083530
PCT Pub. Date: May 6, 2021

(65) Prior Publication Data
US 2022/0372956 A1   Nov. 24, 2022

(51) Int. Cl.
*F03D 80/50* (2016.01)
*F03D 7/02* (2006.01)

(52) U.S. Cl.
CPC .......... *F03D 80/50* (2016.05); *F03D 7/0244* (2013.01)

(58) Field of Classification Search
CPC .... F03D 80/50; F03D 7/0244; F05B 2230/80; Y02E 10/72; Y02P 70/50
See application file for complete search history.

(56) References Cited

U.S. PATENT DOCUMENTS

2011/0138595 A1   6/2011   Shiraishi et al.
2019/0309532 A1   10/2019  Buck et al.

FOREIGN PATENT DOCUMENTS

| CN | 201071290 Y | 6/2008 |
|---|---|---|
| CN | 201739104 U | 2/2011 |
| CN | 203765552 U | 8/2014 |
| CN | 207256145 U | 4/2018 |
| CN | 208057313 U | 11/2018 |
| EP | 3336037 A1 | 6/2018 |
| FR | 2956852 A1 | 9/2011 |
| WO | 2018/015339 A1 | 1/2018 |

OTHER PUBLICATIONS

International Search Report and Written Opinion for corresponding PCT/EP2019/079936 dated Jul. 10, 2020 (10 pp).

*Primary Examiner* — Aaron R Eastman
(74) *Attorney, Agent, or Firm* — Renner, Kenner; Arthur M. Reginelli

(57) ABSTRACT

A wind turbine apparatus for use in movement of components of a wind turbine. The wind turbine apparatus has an upright support means, the upright support means being adaptable to be set on a surface below a load in use, such that the weight of the load is transferred to the surface. The wind turbine apparatus further has a load bearing means for engaging a load, the load bearing means being operably coupled with the upright support means and being configured to be moveable laterally when bearing a load. The wind turbine apparatus further has a means for raising and lowering the load bearing means. The wind turbine apparatus can be used for supporting, raising and lowering yaw brake calipers.

20 Claims, 16 Drawing Sheets

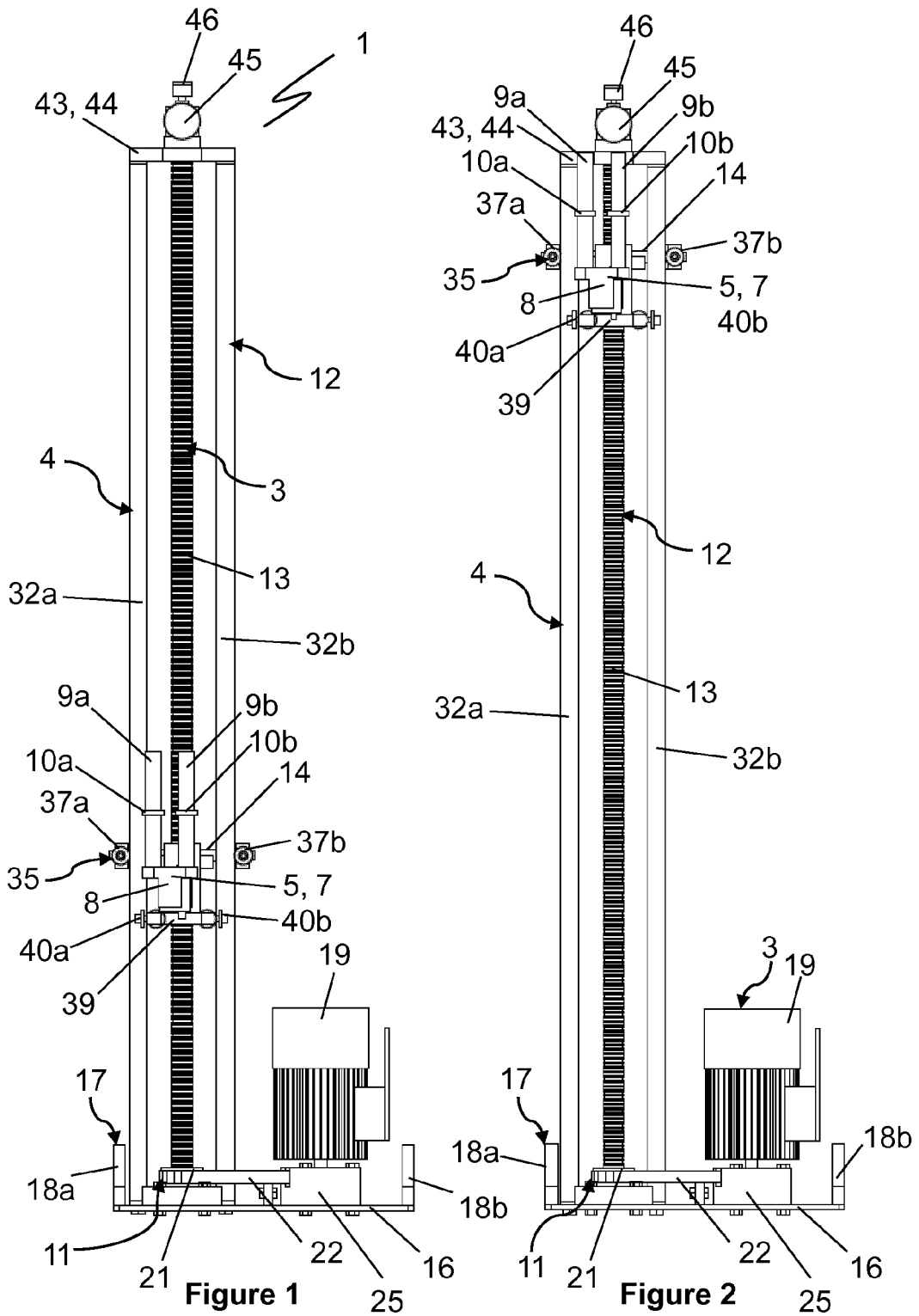

WIND TURBINE APPARATUS

The present invention relates to an apparatus for a wind turbine, in particular, a wind turbine apparatus adapted for engaging with and moving components of a wind turbine yaw system.

Wind turbines require regular observation and maintenance to maintain optimal functionality and efficiency. Industrial-scale wind turbines, such as those used in wind farms, typically comprise a vertical tower, a nacelle fitted to the top of the tower and a rotor fitted at one end of the nacelle. The rotor has blades which, when moved by the wind, cause a horizontal rotor shaft, which extends into the nacelle, to rotate. This kinetic energy is converted to electrical energy by a generator situated within the nacelle. These wind turbines further typically have a yaw system that rotates the nacelle about the vertical axis of the tower to ensure that the rotor is optimally positioned relative to the current wind direction. The yaw system, which is located near the top of the tower where the tower meets the nacelle, includes a yaw drive, a yaw motor, a disk brake and a series of brake calipers positioned around the disk brake. When the yaw motor is operated it engages the yaw drive and the nacelle rotates about the axis of the vertical tower. However, when the yaw motor is turned off the nacelle may still freely rotate and so it is necessary to use a braking system. When operated, the brake calipers clamp on the disk brake and slow the rotation of the nacelle and can hold the nacelle in place relative to the tower when rotation about the vertical axis is not required.

The orientation of the rotor must be altered each time the wind changes direction to ensure optimal efficiency of the wind turbine. Accordingly, the yaw brakes are consistently in use and the brake pads can quickly wear. It is important that the condition of the yaw brakes is regularly monitored and, when required, the yaw brake calipers are repaired or replaced. To do so, at least two engineers must ascend the tower to a platform just below the yaw system. A torque drill is then raised by the engineers up to a brake caliper and used to loosen the bolts that hold the caliper in place. The caliper is then slid away from the disk brake by the engineers who must bear the weight of the caliper which, in some wind turbines, can weigh more than 100 kg. The engineers then lower the caliper to the platform and check for wear and replace components if necessary. The caliper then must be returned to the disk brake by the engineers and a torque drill used to tighten the bolts to fix the caliper in position.

Maintenance of wind turbine yaw systems is, therefore, a very physically demanding task. The number of wind turbines that can be assessed by a group of engineers in a day is limited by the levels of physical exhaustion experienced by the engineers. Employers of wind turbine engineers can therefore express an employment selection bias towards engineers having high physical strength. This limits the pool of candidates that can be employed, and the high levels of physical exertion can cause early, forced retirement for engineers who are no longer physically able to work. Further, injury rates in wind turbine engineers are unacceptably high due, in large part, to manual handling of heavy wind turbine components.

It is an object of the invention to mitigate or obviate the problems associated with manual handling of wind turbine components.

It is a further object of the invention to mitigate or obviate the problem of manually raising and lowering component parts of wind turbine yaw systems.

It is a further object of the invention to mitigate or obviate the problems associated with raising a tool to a yaw brake.

It is a further object of the invention to mitigate or obviate the problems associated with raising and lowering yaw brake calipers to a yaw brake disk.

According to a first aspect of the invention there is provided a wind turbine apparatus for use in movement of components of a wind turbine, the wind turbine apparatus comprising an upright support means, a load bearing means for engaging a load, and a means for raising and lowering the load bearing means.

The wind turbine apparatus is preferably useable for engaging with, and supporting the load of, a yaw brake caliper.

Ideally, the load bearing means being operably coupled with the upright support means.

Ideally, the upright support means is adapted to be set on a surface below a load in use, such that the weight of the load is transferred to the surface.

Preferably, the upright support means is adapted to extend from a surface below a load, to the load that is to be engaged by the load bearing means.

Ideally, the wind turbine apparatus is mountable to a surface.

Preferably, the apparatus comprises a means for mounting the wind turbine apparatus to a surface, most preferably, to a surface on a wind turbine.

Preferably, the means for mounting the wind turbine apparatus being capable of mounting the wind turbine apparatus on or about a tower of a wind turbine.

Ideally, the means for mounting the wind turbine apparatus being capable of mounting the wind turbine apparatus within a tower of a wind turbine.

Preferably, the means for mounting the wind turbine apparatus being capable of mounting the wind turbine apparatus proximal to a yaw system of a wind turbine.

Ideally, the means for mounting the wind turbine apparatus being capable of mounting the wind turbine apparatus on a platform within the tower of a wind turbine, below the yaw system.

Ideally, the means for mounting the wind turbine apparatus on a wind turbine being a means for fixedly mounting the wind turbine apparatus on the wind turbine.

Preferably, the means for mounting the wind turbine apparatus on a wind turbine being a means for releasably fixedly mounting the wind turbine apparatus on the wind turbine.

Ideally, the load bearing means being operable to engage with and bear the load of a yaw brake caliper.

Ideally, the upright support means forming a part of the means for raising and lowering the load bearing means.

Preferably, the means for raising and lowering the load bearing means being operable to raise and lower the load bearing means between a platform within the tower of a wind turbine and the yaw system of the wind turbine.

Ideally, in use, the upright support means being situated proximal to a yaw system of a wind turbine.

Preferably, in use, the upright support means being situated away from any access openings within the platform of the wind turbine.

Preferably, the wind turbine apparatus can support the weight of a yaw brake caliper and can raise or lower a yaw brake caliper.

Ideally, the wind turbine apparatus can support a weight of at least 50 kg.

Preferably, the wind turbine apparatus can support a weight of at least 75 kg.

Ideally, the wind turbine apparatus can support a weight of at least 100 kg.

Preferably, the wind turbine apparatus can support a weight of at least 125 kg.

Advantageously, an engineer is not required to physically raise or lower a yaw brake caliper when inspecting, repairing or replacing the yaw brake calipers.

In one embodiment, the load bearing means comprises an arm and/or a platform.

In another embodiment the load bearing means comprising a plurality of arms.

Ideally, the load bearing means is configured to be moveable laterally when bearing a load.

Ideally, when mounted, the load bearing means is moveable in a lateral direction.

Preferably, the load bearing means is moveable laterally relative the base.

In one embodiment, the load bearing means being operable to extend and/or contract.

Preferably, the arm being operable to extend and/or contract.

Ideally, the arm being operable to extend away from the means for raising and lowering the load bearing means and/or contract towards the means for raising and lowering the load bearing means.

In one embodiment, the arm being a telescopic arm.

Preferably, the load bearing means being operable to extend and/or contract within a plane.

Ideally, the arm being operable to extend and/or contract within a plane.

Preferably, the load bearing means being operable to extend and/or contract within a lateral plane.

Preferably, the arm being operable to extend and/or contract within a lateral plane.

Ideally, the arm being an articulated arm.

Advantageously, this provides the arm with manoeuvrability such that it can be easily positioned within the tower of the wind turbine.

Ideally, the load bearing means and/or the upright support means being adaptable for engagement with a yaw brake caliper.

Ideally, the load bearing means being adapted to engage with a yaw brake caliper.

Preferably, the load bearing means being sized to be inserted into an opening on the yaw brake caliper.

Preferably, the arm being adaptable for engagement with a yaw brake caliper.

Advantageously, the arm can engage with a yaw brake caliper and move a brake caliper. In some wind turbines there are access openings located directly beneath the brake calipers. In such cases it is not possible to directly lower a brake caliper vertically downwards as it could fall within or block the access opening. Advantageously, the wind turbine apparatus is capable of lowering a brake caliper and moving it away from an access opening such that it can be safely set on the platform of the wind turbine without requiring manual handling.

Ideally, the wind turbine apparatus being operable to support a yaw brake caliper above a platform surface of a wind turbine such that there is a clearance space between the yaw brake caliper and the platform surface of the wind turbine, the clearance space being directly beneath the yaw brake caliper.

Preferably, the load bearing means being adaptable for engagement with a torque drill such that the apparatus can raise or lower a torque drill.

Ideally, the arm being adaptable for engagement with a torque drill.

Advantageously, the wind turbine apparatus can be used to raise a torque drill up to the bolts of a yaw brake caliper thereby obviating the requirement for engineers to manually lift the torque drill.

In one embodiment, the load bearing means comprising an adaptable utility apparatus.

Ideally, the arm comprising an adaptable utility apparatus.

Preferably, the adaptable utility apparatus being adaptable to engage with a tool and/or a wind turbine yaw component.

Ideally, the load bearing means comprising two terminal ends.

Preferably, the arm comprising two terminal ends.

Preferably, the load bearing means comprising a first terminal end located at or about the means for raising or lowering the load bearing means.

Ideally, the arm comprising a first terminal end located at or about the means for raising or lowering the load bearing means.

Preferably, the load bearing means comprising a second terminal end, the adaptable utility apparatus being located at or about the second terminal end.

Preferably, the arm comprising a second terminal end, the adaptable utility apparatus being located at or about the second terminal end.

Preferably, the means for raising or lowering the load bearing means being operable to raise or lower the adaptable utility apparatus.

Ideally, the adaptable utility apparatus being pivotable by at least 45°.

Preferably, the adaptable utility apparatus being pivotable by at least 70°.

Ideally, the adaptable utility apparatus being pivotable by at least 90°.

Preferably, the adaptable utility apparatus being pivotal relative to the load bearing means.

Preferably, the adaptable utility apparatus being pivotal relative to the arm.

Ideally, the adaptable utility apparatus being pivotal about the load bearing means.

Preferably, the adaptable utility apparatus is pivotal about the load bearing means about a horizontal axis/or and a vertical axis.

Ideally, the wind turbine apparatus comprises a lock to prevent pivotal movement of the adaptable utility apparatus about at least one pivot axis relative to the load bearing means.

Preferably, the lock is a locking pin that extends through the adaptable utility apparatus and into the load bearing means.

Ideally, the adaptable utility apparatus being pivotal about the arm.

In one embodiment, the adaptable utility apparatus comprising a yaw brake engagement tool.

Ideally, the yaw brake engagement tool comprising at least one prong for engaging a yaw brake caliper.

Preferably, the yaw brake engagement tool comprising a plurality of prongs for engaging a yaw brake caliper.

Ideally, the plurality of prongs being spaced apart.

Preferably, the at least one prong being sized to correspond to an opening in a yaw brake caliper such that the at least prong can be inserted into said opening.

Ideally, the at least one prong being substantially cylindrical.

Preferably, the at least one prong comprising a shoulder.

Ideally, the shoulder being situated approximately centrally along the at least one prong.

Advantageously, in use, the yaw brake caliper rests on the shoulder of the at least one prong.

Ideally, the yaw brake engagement tool being pivotal relative to the load bearing means.

Ideally, the yaw brake engagement tool being pivotal relative to the arm.

Ideally, the yaw brake engagement tool being pivotable by at least 45°.

Preferably, the yaw brake engagement tool being pivotable by at least 70°.

Ideally, the yaw brake engagement tool being pivotable by at least 90°.

Advantageously, the orientation of the yaw brake engagement tool can be altered. A yaw brake caliper sitting on the platform of the wind turbine can be tipped on its side to expose the apertures for receiving bolts to fix the yaw brake caliper to the brake disk. The yaw brake engagement tool can be orientated to be aligned with these apertures and the prongs inserted into the apertures. An operator can then raise the load bearing means of the wind turbine apparatus thereby raising the yaw brake caliper off the platform. Once sufficiently clear of the platform the operator can pivot the yaw brake engagement tool to reposition the yaw brake caliper into the correct orientation. With the exception of some minimal manoeuvring of yaw brake caliper to expose the apertures (if necessary), the operator does not need to manually handle the yaw brake caliper to install the yaw caliper.

In another embodiment, the adaptable utility apparatus comprising an apparatus for engaging a power tool.

Ideally, the apparatus for engaging a power tool being operable to engage with a torque drill.

Preferably, the apparatus for engaging a power tool being operable to secure a torque drill to the wind turbine apparatus.

Preferably, the means for raising and lowering the load bearing means comprises a drive means for raising or lowering the load bearing means.

Preferably, the wind turbine apparatus, most preferably, the means for raising or lowering the load bearing means, comprising an upright guide apparatus for guiding movement of the load bearing means.

In one embodiment, the means for raising or lowering the load bearing means comprises a plurality of upright guide apparatuses.

Ideally, the load bearing means extends between, and is support by, the plurality of upright guide apparatuses.

In one embodiment, each upright guide apparatus extends through the load bearing means.

Preferably, the load bearing means being guided by the upright guide apparatus or apparatuses.

Ideally, the arm or platform being guided by the upright guide apparatus.

Preferably, the drive means being operable to move the load bearing means along the upright guide apparatus or apparatuses.

Ideally, the drive means being operable to move the arm or platform along the upright guide apparatus.

Ideally, the drive means comprising a screw drive actuator.

Preferably, the drive means comprising a lead screw actuator.

Preferably, one or more upright guide apparatus comprises an elongate rail.

Ideally, the elongate rail being a spindle, most preferably, a threaded spindle.

Ideally, the upright guide apparatus is rotatable.

Preferably, the upright guide apparatus is operably engaged with the load bearing means such that axial rotation of the upright guide apparatus results in movement of the load bearing means in the axial direction of the upright guide apparatus.

Preferably, the elongate rail being rotatable.

Ideally, the drive means being operable to rotate the upright guide apparatus or apparatuses, most preferably, the elongate rail.

Preferably, the drive means being operable to rotate the upright guide apparatus or apparatuses thereby moving at least part of the load bearing means along the upright guide apparatus or apparatuses.

Preferably, the drive means being operable to rotate the upright guide apparatus or apparatuses, most preferably, the elongate rail, thereby moving at least part of the arm or platform along the upright guide apparatus or apparatuses.

Preferably, the means for raising or lowering the load bearing means comprising one or more carriages for carrying the load bearing means along the upright guide apparatus or apparatuses.

Ideally, the carriage being operably engaged with the upright guide apparatus.

Preferably, the means for raising or lowering the load bearing means comprising one or more load bearing means engagement members.

Preferably, the load bearing means engagement member forming a part of the carriage. Ideally, the upright guide apparatus comprising a load bearing means engagement member.

Preferably, the or each carriage is in operable engagement with one of the elongate rails.

Ideally, the load bearing means engagement member being in operable engagement with the elongate rail.

Preferably, the load bearing means engagement member comprising a threaded portion.

Ideally, the load bearing means engagement member comprising a tube.

Preferably, the tube comprising an internal thread.

Preferably, the internal thread being sized to engage with the threaded spindle.

Preferably, the drive means being operable to rotate the elongate rail thereby moving the carriage and the load bearing means along the elongate rail. This thereby drives movement of the load bearing means along the elongate rail.

Ideally, the wind turbine apparatus comprising a stop means for stopping the movement of load bearing means in at least one direction.

Ideally, the stop means being operable to stop movement of the carriage or carriages along the upright guide apparatus or apparatuses, most preferably, along the elongate rail or rails.

In one embodiment, the stop means being operable to stop the means for raising and lowering the load bearing means when the means for raising and lowering the load bearing means is in operation.

Preferably, the stop means being operable to stop the rotation of the elongate rail.

Preferably, the stop means being operable to stop the drive means.

Ideally, the stop means being operable to temporarily stop the drive means.

Preferably, the stop means being operable to stop the motor.

Ideally, the stop means being operable to temporarily stop the motor.

Ideally, the stop means being adapted to detect when the carriage is at least one preset location along the upright guide apparatus or apparatuses.

Preferably, the at least one preset location comprising the end portions of the upright guide apparatus or apparatuses.

Preferably, the stop means comprising at least one cut-off switch.

Advantageously, this prevents the drive means from working more than is necessary. It can also prevent damage to component parts of the wind turbine apparatus.

Ideally, the stop means is further configured to slow down movement of the load bearing means as it approaches one or both end portions of the upright guide apparatus or apparatuses.

Preferably, the stop means comprises sensors for determining the location of the load bearing means relative to the upright guide apparatus or apparatuses.

Preferably, the sensors are configured to relay data relating to the location of the load bearing means relative to the upright guide apparatus or apparatuses to the drive means, the drive means being configured to react to said data to alter the speed of movement of the load bearing means, most preferably, by slowing movement of the load bearing means as it approaches one or both end portions of the upright guide apparatus or apparatuses.

Preferably, the wind turbine apparatus comprising a base.

Ideally, the base forming a part of the upright support means.

Preferably, the base defining the bottom of the upright support means.

Ideally, the upright guide apparatus being disposed on, most preferably connected to, the base.

Preferably, the base comprising a substantially planar portion.

In one embodiment, the base comprising feet, ridges and/or grooves.

Ideally, the feet, ridges and/or grooves being sized and shaped to interact with corresponding features on a wind turbine surface.

In one embodiment, the base having wheels for moving the apparatus.

Ideally, the base being dimensioned to rest on a wind turbine platform at or near the yaw system.

Preferably, the base being mountable and/or connectable to a wind turbine surface.

Ideally, the means for mounting the wind turbine apparatus comprising a hook or latch.

Ideally, the means for mounting the wind turbine apparatus comprising a plurality of hooks and/or latches.

Preferably, the hook or latch being dimensioned to engage with a part of a wind turbine.

Ideally, the hook or latch operable to stabilise the wind turbine apparatus when the weight of the arm is altered.

Ideally, the hook or latch being disposed on the base.

Preferably, the hook or latch extending upwards from the base.

In one embodiment, the means for mounting the wind turbine apparatus comprising the base having apertures and/or through-bores for receiving bolts, screws and/or other fixing devices.

Preferably, the longitudinal axis of the upright guide apparatus being perpendicular to the base.

Ideally, the drive means comprising a motor, the motor being operable to drive rotation of the upright guide apparatus.

Preferably, the motor being an electrically-powered motor.

Ideally, the motor being disposed on the base.

Preferably, wherein the upright guide apparatus or apparatuses is removable from the base. Advantageously, in the embodiment where the upright guide apparatus or apparatuses are sized to be inserted into a part of the yaw brake caliper, the upright guide apparatus or apparatuses can be removed from the base and inserted into the yaw brake caliper. The base can then be positioned below the upright guide apparatus or apparatuses and they can be fixed to the base for operation of the wind turbine apparatus.

Ideally, the upright guide apparatus or apparatuses are removable from the driven members, most preferably, by unscrewing.

Preferably, the drive means comprising a driving member and at least one driven member.

Preferably, the motor being operable to drive the driving member.

Ideally, the motor could be provided by an auxiliary drive means such as an electrically powered drill.

Alternatively, the driving member could be manually operated using a ratchet mechanism, for example.

Ideally, the driving member being operable to drive the driven member(s).

In one embodiment, the driving member is operably connected to the driven member by a connection means.

Ideally, the connection means transfers motion from the driving member to the driven member.

Alternatively, the driving member and driven member are interlocking cogwheels, such that rotation of the driving member results in opposite rotation of the drive member.

Ideally, the driven member being situated at or about the upright guide apparatus. Most preferably, each upright guide apparatus is operably engaged with, most preferably being fixed relative to, a driven member.

Preferably, the driven member forming a part of the upright guide apparatus.

Ideally, the driving member and/or the driven member being situated at or about the base.

Preferably, the driving member and/or the driven member being disposed on and fixed to the base.

In one embodiment, there are two or more driven members arranged in interlocking arrangement with one another, such that rotation of the driving member results in rotation of each driven member.

In one embodiment, there are three spaced apart upright guide apparatuses and three driven members in operable engagement with the three upright apparatuses.

The middle upright guide apparatus can be made to rotates in the same direction as the other upright guide apparatuses through an intermediate cogwheel, or it can be configured to rotate in the opposite direction to the two other upright guide apparatuses.

In another embodiment, the driving member and/or the driven member being a sprocket wheel.

Preferably, the driving member being spaced apart from the driven member.

Ideally, the connection means comprises a loop.

Ideally, the loop being a closed belt.

Preferably, the loop being situated around the driving member and driven member.

Ideally, the closed belt having teeth and being operable to engage with the driving member and the driven member.

Ideally, the motor being operable to rotate the driving member.

Preferably, when the driving member is rotated by the motor, the connection means and the driven member are correspondingly rotated.

Preferably, when the driven member is rotated it causes the elongate rail to rotate. Ideally, the drive means comprising a housing.

Preferably, the housing houses at least part of the motor, the driving member, the driven member and/or the connection means.

Ideally, the housing extending upwards from the base.

Preferably, the housing forming a part of the base.

Ideally, the housing being formed from metal, most preferably, aluminium.

Preferably, the longitudinal axis of the load bearing means is substantially perpendicular to the upright guide apparatus.

Ideally, the arm being substantially perpendicular to the upright guide apparatus.

Preferably, the wind turbine apparatus comprising a means for moving the load bearing means laterally.

Preferably, the means for moving the load bearing means laterally being operable to move at least part of the load bearing means annularly about a pivot point.

Advantageously, this enables the load bearing means to support and position a load in a range of lateral locations.

Ideally, the load bearing means being pivotally engaged with the upright guide apparatus.

Preferably, the arm being pivotally engaged with the upright guide apparatus.

Ideally, the load bearing means being pivotally engaged with the means for raising and lowering the load bearing means.

Preferably, the load bearing means engagement member comprising a pivoted arrangement such that the arm can pivot relative to the load bearing means engagement member.

Ideally, the load bearing means engagement member comprising a hinge.

Preferably, the load bearing means being connected to the load bearing means engagement member via the hinge.

Ideally, the arm being connected to the load bearing means engagement member via the hinge.

Preferably, by pivoting the load bearing means relative to the load bearing means engagement member, at least part of the load bearing means can be moved through a lateral plane.

Preferably, by pivoting the arm relative to the load bearing means engagement member, at least part of the arm can be moved through a lateral plane.

Ideally, the arm being articulated.

Preferably, the arm comprising a plurality of arm portions.

Ideally, the plurality of arm portions are hingedly or flexibly connected together.

Advantageously, this provides articulation to the arm.

Ideally, at least two arm portions are connected to one another by a hinge.

Preferably, the arm comprising an arm hinge.

Ideally, the arm comprising two arm portions, Preferably, the two arm portions are connected by the arm hinge.

Ideally, the arm hinge is located between the first terminal end and the second terminal end of the arm.

Preferably, the arm hinge is located between the load bearing means engagement member and the adaptable utility apparatus.

Preferably, the arm hinge is located on the arm at a position equidistance from the first terminal end and the second terminal end.

Ideally, in use, the plurality of arm portions being coplanar.

Ideally, the upright support means comprising at least one elongate support member.

Preferably, the upright support means comprising a plurality of elongate support members.

Ideally the upright support means comprising a plurality of spaced apart elongate support members.

Preferably, the upright support means comprising two spaced apart elongate support members.

Ideally, the at least one elongate support member comprising a cylindrical or polygonal cross section.

Ideally, the at least one elongate support member extending proximal to the elongate rail.

Ideally, the at least one elongate support member extending upwards from the base.

Ideally, the upright support means providing support to the carriage.

Preferably, the upright support means stabilizing the carriage when the carriage is moved along the elongate rail.

Preferably, at least part of the carriage being situated at or about the at least one elongate support member.

Ideally, the elongate rail is disposed adjacent to the two elongate support members such that the elongate rail and the two elongate support members define a triangular shape.

Preferably, the carriage comprising a bracket for engaging with the at least one elongate support member.

Ideally, the bracket mounting the carriage to the at least one elongate support member.

Preferably, the bracket being disposed around the at least one elongate support member.

Ideally, the bracket being slidably engaged with the at least one elongate support member.

Preferably, the bracket comprising locating means for locating the bracket on the at least one elongate support member.

Ideally, the locating means comprising means for preventing lateral movement of the bracket.

Ideally, the bracket prevents lateral movement of the carriage.

Preferably, the means for preventing lateral movement of the bracket comprising a rear component, the at least one elongate support member being located between the rear component and the elongate rail.

Preferably, the rear component extending between the two elongate support members.

Ideally, the rear component pressing against the two elongate support members.

Preferably, the rear component prevents the bracket from being moved in a direction towards the location of the elongate rail.

Ideally, the locating means comprises at least one, most preferably, two stoppers.

Preferably, the at least one stopper being disposed on the rear component.

Ideally, the locating means comprising a stopper being disposed on the rear component adjacent to the at least one elongate support member.

Preferably, the rear component comprising two opposing terminal ends.

Ideally, a stopper being disposed at each of the two opposing terminal ends.

Preferably, the stoppers abutting the two elongate support members.

Ideally, the two elongate support members being located between the two stoppers.

Advantageously, the stoppers prevent movement of the bracket in a lateral direction.

Ideally, the means for preventing horizontal movement of the bracket comprising a front component.

Preferably, the front component being at least partially disposed on the at least one elongate support member at a location opposing the position of rear component.

Ideally, the front component comprising at least one protrusion positioned abutting the at least one elongate support member.

Preferably, the front component, most preferably the at least one protrusion, prevents movement of the bracket in a direction away from the location of the elongate rail.

In another embodiment, the rear component and/or the front component prevents movement of the bracket in a direction towards and/or away from the location of the elongate rail.

Ideally, the wind turbine apparatus, most preferably, the mounting means, comprising one or more mounting support members.

Preferably, the mounting support member or members being lateral support member or members.

Preferably, the lateral support member forms a part of the mounting means.

Preferably, the upright support means comprising a lateral support member.

Preferably, the lateral support member extending perpendicularly to the longitudinal direction of the upright guide apparatus or apparatuses.

Ideally, the lateral support member is extendible and/or contractible.

Ideally, the lateral support member being an elongate rod.

In one embodiment, the mounting support member, most preferably the lateral support member, having a means for extending and/or contracting.

Ideally, the means for extending and/or contracting being provided by the elongate rod being arranged in a telescopic configuration.

Preferably, the lateral support member being operable to engage with and/or anchor the wind turbine apparatus to a wind turbine structure.

Ideally, the mounting support member comprising a means for engaging with and/or anchoring the wind turbine apparatus to a wind turbine structure.

Preferably, the means for engaging with and/or anchoring the wind turbine apparatus to a wind turbine structure comprising an anchor, hook or abutment member.

Advantageously, this provides additional structural support to the wind turbine apparatus. When the abutment member is located abutting a wind turbine structure, and the wind turbine apparatus is tilted in the direction of extension of the lateral support member, for example, when an additional weight is added to the arm, the abutment member presses against the wind turbine structure and stabilises the wind turbine apparatus.

Ideally, the lateral support member being pivotable.

Preferably, the lateral support member being laterally pivotable.

Preferably, the wind turbine apparatus comprising a lateral support member pivot.

Ideally, the upright guide apparatus or apparatuses can move relative to the mounting support member or members, when the mounting support member or members are fixed to a surface.

Preferably, the mounting support member and the upright support means are moveably connected to one another via a rack and pinion mechanism, whereby the mounting support member is the rack, and whereby rotating a pinion on the upright support means results in lateral movement of the load bearing means.

Preferably, the upright guide apparatus extending upwards from the base.

Ideally, the upright guide apparatus having an upper terminal end.

Preferably, the upright guide apparatus comprising a stop member at or about the upper terminal end.

Advantageously, this prevents the arm from being moved up and off the terminal end of the upright guide apparatus.

Ideally, the at least one elongate support member being joined to the stop member.

Ideally, part of the lateral support member being disposed at or about the stop member.

Preferably, the lateral support member pivot being disposed at or about the stop member.

Preferably, the stop member being disposed between at least part of the lateral support member and the elongate rail.

Ideally, the stop member being disposed between the lateral support member pivot and the elongate rail.

Preferably, the wind turbine apparatus comprising a means for securing the lateral support member at or about the upright guide apparatus.

Ideally, the wind turbine apparatus comprising a means for securing the lateral support member to the stop member.

Preferably, the means for securing the lateral support member to the stop member comprising an adjustable screw.

Preferably, the wind turbine apparatus comprising a control means, the control means being operable to control movement of the load bearing means.

Preferably, the wind turbine apparatus comprising a control means, the control means being operable to control movement of the arm or platform.

Ideally, the upright support means comprising a control means, the control means being operable to control movement of the arm or platform.

Ideally, the control means being operable to control the means for raising and lowering the load bearing means.

Preferably, the control means being operable to control the drive means.

Ideally, the control means being operable to control the motor.

Preferably, the control means comprising a control panel.

Ideally, the control panel being operably connected to the motor.

Preferably, the control panel comprising a user interface such that a user can input commands to control movement of the wind turbine apparatus.

Ideally, the user interface comprising a switch, a button, touchscreen, a microphone and/or other means of inputting commands.

Ideally, the control means having an up button, a down button and/or a stop button for moving the load bearing means up, down and stopping upward/downward movement of the load bearing means respectively.

Preferably, the wind turbine apparatus being formed at least partially from metal.

Ideally, the wind turbine apparatus being formed at least partially from a metal alloy, most preferably steel.

Ideally, the wind turbine apparatus can be disassembled for ease of movement ID between wind turbines.

Preferably, the wind turbine apparatus being configured to engage with and to be guided by a guide track.

Advantageously, a guide track can be disposed on the tower of a wind turbine and the wind turbine apparatus can be guided around the tower via the guide track.

Ideally, the wine turbine apparatus comprises a means for travelling along a guide track.

Preferably, the wind turbine apparatus is configured to be controlled by an automation system.

Ideally, the wind turbine apparatus comprises sensors for determining the position of the wind turbine apparatus and component parts thereof relative to the yaw brakes of the wind turbine in which the wind turbine apparatus is installed.

Preferably, the wind turbine apparatus comprises sensors on the means for mounting the wind turbine apparatus on the wind turbine, the load bearing means, and/or the wind turbine apparatus travelling means.

Ideally, the sensors are configured to provide feedback to an electronic control unit of an automation system.

Preferably, the wind turbine apparatus comprises electromechanical actuators that are operably couplable to an electronic control unit.

Ideally, the electromechanical actuators are operably coupled to the load bearing means, the travelling means and/or the mounting means for moving these components in response to an electrical input.

Preferably, the drive means is configured to be controlled by an automation system.

Advantageously, the automation of the periodic maintenance of the braking system at the top of the wind turbine means that the costs of this work is dramatically reduced. This is especially significant in offshore wind farms where an operator on a boat can connect in to each wind turbine in turn using telecommunications system to initiate a test of the braking system such as testing the torque of the bolts of the calipers or testing the depth of the calipers via wear sensors on the calipers of the disk brake. Furthermore, the operator on a boat or remotely can connect in to each wind turbine in turn using telecommunications system to view the internal space of the top of the tower as well as the condition of the braking system via one or more cameras mounted on the wind turbine or the wind turbine apparatus.

Preferably, the wind turbine apparatus comprises an electromagnetic braking system for fixing the location of the wind turbine apparatus relative to the guide track.

Ideally, the electromagnetic braking system is configured to be operably coupled to an electronic control unit.

Preferably, the wind turbine apparatus comprising a tool carousel comprising an adaptable utility apparatus and a torque wrench operably couplable to the electronic control unit.

Ideally, the tool carousel, the utility apparatus and/or the torque wrench have position sensors for detecting their position relative to the brake caliper bolts and bolt holes to allow the electronic control unit to position the utility apparatus in the bolt holes and to allow the torque wrench to locate on the bolts to insert, remove and periodically test the torque of the bolts for maintenance.

According to a second aspect of the invention there is provided a wind turbine comprising a tower, a nacelle, a yaw system, and a platform below the location of the yaw system, the yaw system comprising a yaw brake disk and yaw brake calipers arranged around the yaw brake disk, the wind turbine further comprising a wind turbine apparatus disposed proximal to the yaw brake calipers and operable to engage with the yaw brake calipers, the wind turbine apparatus comprising an upright support means, a load bearing means for engaging a load, a means for raising and lowering the load bearing means, and a means for mounting the wind turbine apparatus on a wind turbine.

According to a third aspect of the invention there is provided a method for installing, repairing and/or replacing wind turbine yaw brake calipers, the method comprising using a wind turbine apparatus to raise or lower a yaw brake caliper, the wind turbine apparatus comprising an upright support means, a load bearing means for engaging a load, a means for raising and lowering the load bearing means, and a means for mounting the wind turbine apparatus on a wind turbine.

Ideally, the method comprising mounting the wind turbine apparatus to a wind turbine proximal to a yaw system via the means for mounting the wind turbine apparatus on a wind turbine.

Preferably, the method comprising ensuring that the wind turbine apparatus is safely secured to the wind turbine.

Ideally, the method comprising extending or contracting and/or anchoring the lateral support member to a wind turbine support structure.

Ideally, the method comprising fitting a torque drill to the apparatus for engaging a power tool.

Ideally, the method comprising raising the load bearing means.

Preferably, the method comprising raising the arm or platform.

Preferably, the method comprising raising the load bearing means by inputting a command via the control means.

Ideally, the method comprising raising the arm by inputting a command via the control means.

Preferably, the method comprising raising the load bearing means via the means for raising and lowering the load bearing means.

Preferably, the method comprising raising the load bearing means via the means for raising and lowering the load bearing means.

Preferably, the method comprising positioning the torque drill at a yaw brake caliper.

Ideally, the method comprising extending or contracting the arm.

Preferably, the method comprising extending or contracting the arm through a lateral plane.

Ideally, the method comprising moving the load bearing means via the means for moving the load bearing means laterally.

Ideally, the method comprising moving the arm via the means for moving the load bearing means laterally.

Preferably, the method comprising moving the arm via bending the arm about the arm hinge.

Ideally, the method comprising using the torque drill to release bolts of a yaw brake caliper.

Preferably, the method comprising lowering the load bearing means.

Preferably, the method comprising lowering the arm.

Ideally, the method comprising lowering the load bearing means.

Ideally, the method comprising lowering the arm by inputting a command via the control means.

Preferably, the method comprising removing the torque drill.

Ideally, the method comprising fitting a yaw brake engagement tool to the adaptable utility apparatus.

In one embodiment, the method comprising removing one or more upright guide apparatuses from the base of the wind turbine apparatus.

Ideally, the method comprising the step of inserting one or more upright guide apparatuses in a bolt opening of a yaw brake caliper.

Ideally, the method comprising positioning the base of below the one or more upright guide apparatuses after they have been inserted into bolt openings of a yaw brake caliper and reattaching the one or more upright guide apparatuses to the base.

Preferably, the method comprising raising the load bearing means until it engages with the yaw brake caliper.

Preferably, the method comprising raising the arm.

Ideally, the method comprising positioning the yaw brake engagement tool such that it engages with the yaw brake caliper.

Preferably, the method comprising moving the load bearing means such that the yaw brake caliper moves away from its location within the yaw system.

In one embodiment, the load bearing means is moved by moving the upright guide apparatus or apparatuses.

Preferably, the method comprising moving the arm such that the yaw brake caliper moves away from its location within the yaw system.

Ideally, the method comprising moving the load bearing means such that the yaw brake caliper is not directly above any access openings in the wind turbine.

Ideally, the method comprising moving the arm such that the yaw brake caliper is not directly above any access openings in the wind turbine.

Preferably, the method comprising extending or contracting the load bearing means through a lateral plane.

Preferably, the method comprising extending or contracting the arm through a lateral plane.

Ideally, the method comprising moving the load bearing means via the means for moving the load bearing means laterally.

Ideally, the method comprising moving the arm via the means for moving the load bearing means laterally.

Preferably, the method comprising moving the arm via bending the arm about the arm hinge.

Preferably, the method comprising lowering the load bearing means and therefore the yaw brake caliper.

Preferably, the method comprising lowering the arm and therefore the yaw brake caliper.

Ideally, the method comprising lowering the load bearing means to set the yaw brake caliper on a surface of the wind turbine.

Ideally, the method comprising lowering the arm to set the yaw brake caliper on a surface of the wind turbine.

Preferably, the method comprising pivoting the adaptable utility apparatus.

Ideally, the method comprising moving the arm such that the yaw brake engagement tool disengages with the yaw brake caliper.

Preferably, the method comprising visually inspecting the yaw brake caliper.

Ideally, the method comprising repairing or replacing the yaw brake caliper.

Ideally, the method comprising installing a yaw brake caliper.

In a still further aspect of the invention, there is provided an automation system for controlling the operation of a wind turbine apparatus in the tower of a wind turbine for performing periodic maintenance and repair of the brake system of the wind turbine, the automation system comprising a guide track for guiding motion of the wind turbine apparatus around the platform of the tower relative to the brake system and the wind turbine apparatus having a means for travelling along the guide track, the automation system comprising an electronic control unit having a memory storing a coordinate system comprising the potential relative positions of all of the components of the wind turbine, the nacelle braking system and the wind turbine apparatus thereby providing a datum for automated control of all components of the wind turbine apparatus, the automation system comprising one or more position sensors on the means for mounting the wind turbine apparatus on the wind turbine, the load bearing means and the wind turbine apparatus travelling means, the sensors providing feedback to the electronic control unit of the automation system of the actual position of these components relative to the wind turbine and the braking system, the automation system further comprising electromechanical actuators operably coupled to the load bearing means, the travelling means and the mounting means for moving them, the actuators also being operably coupled to and under the control of the electronic control unit, the automation system further comprising the drive means being operably coupled to the electronic control unit.

Advantageously, the automation of the periodic maintenance of the braking system at the top of the wind turbine means that the costs of this work is dramatically reduced. This is especially significant in offshore wind farms where an operator on a boat can connect in to each wind turbine in turn using telecommunications system to initiate a test of the braking system such as testing the torque of the bolts of the calipers or testing the depth of the calipers via wear sensors on the calipers of the disk brake. Furthermore, the operator on a boat or remotely can connect in to each wind turbine in turn using telecommunications system to view the internal space of the top of the tower as well as the condition of the braking system via one or more cameras mounted on the wind turbine or the wind turbine apparatus.

The automation system further comprising an electromagnetic braking system for fixing the location of the wind turbine apparatus travelling means or carriage relative to the guide track. The electromagnetic braking system being operably coupled to the electronic control unit so as to be automatically operated.

The automation system further comprising a tool carousel comprising an adaptable utility apparatus and a torque wrench operably coupled to the electronic control unit. The tool carousel, the utility apparatus and the torque wrench have position sensors for detecting their position relative to the brake caliper bolts and bolt holes to allow the electronic control unit to position the utility apparatus in the bolt holes and to allow the torque wrench to locate on the bolts to insert, remove and periodically test the torque of the bolts for maintenance.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The invention will now be described with reference to the accompanying drawings which shows by way of example only two embodiments of an apparatus in accordance with the invention.

FIG. 1 is a front elevation view of a wind turbine apparatus according to the invention.

FIG. 2 is the wind turbine apparatus of FIG. 1 with the arm raised to a higher position.

Figures 3, 4:
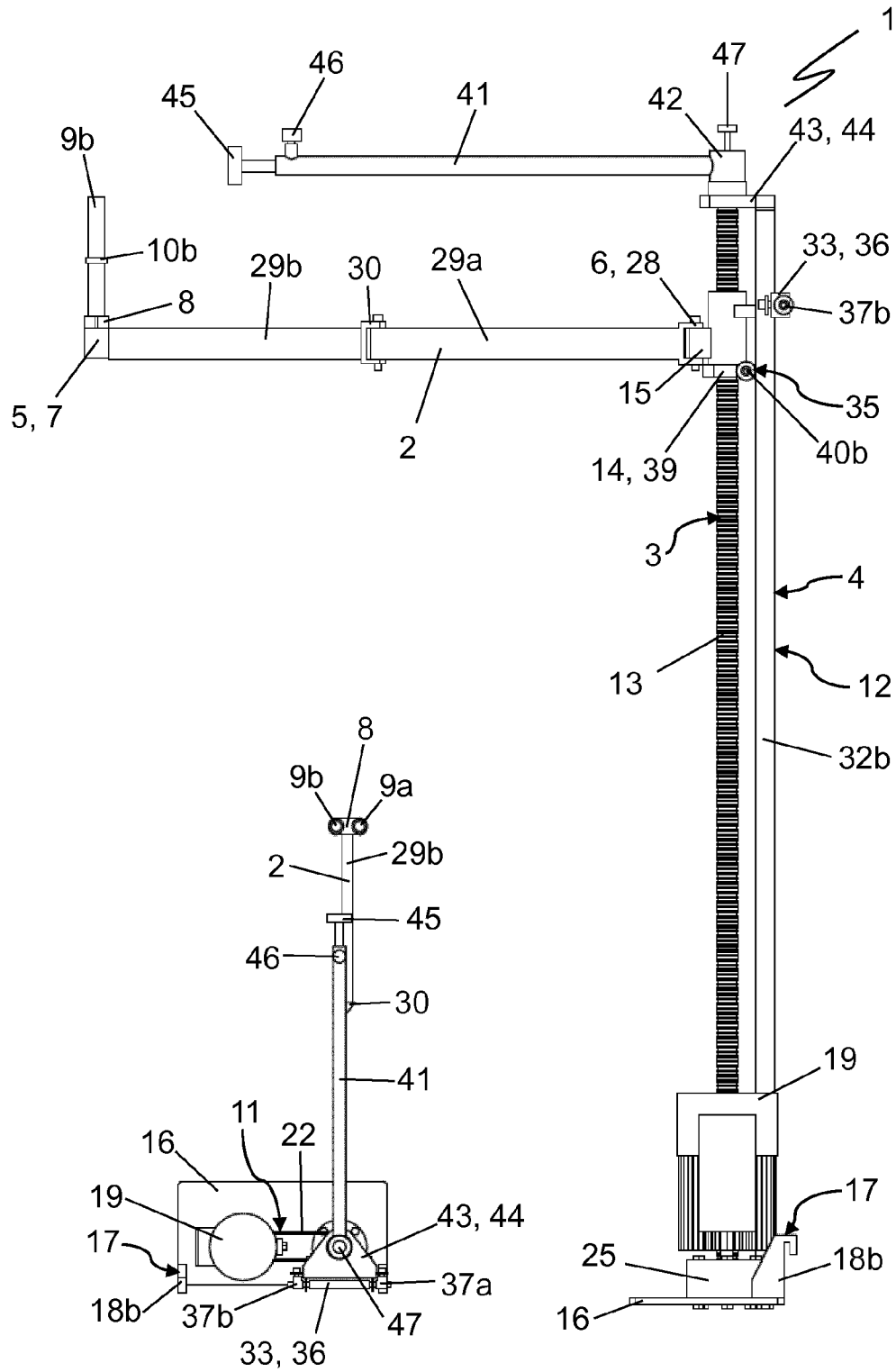
FIG. 3 is a plan view of the wind turbine apparatus of FIG. 2.
FIG. 4 is a side elevation view of the wind turbine apparatus of FIG. 2.
Figure 5:
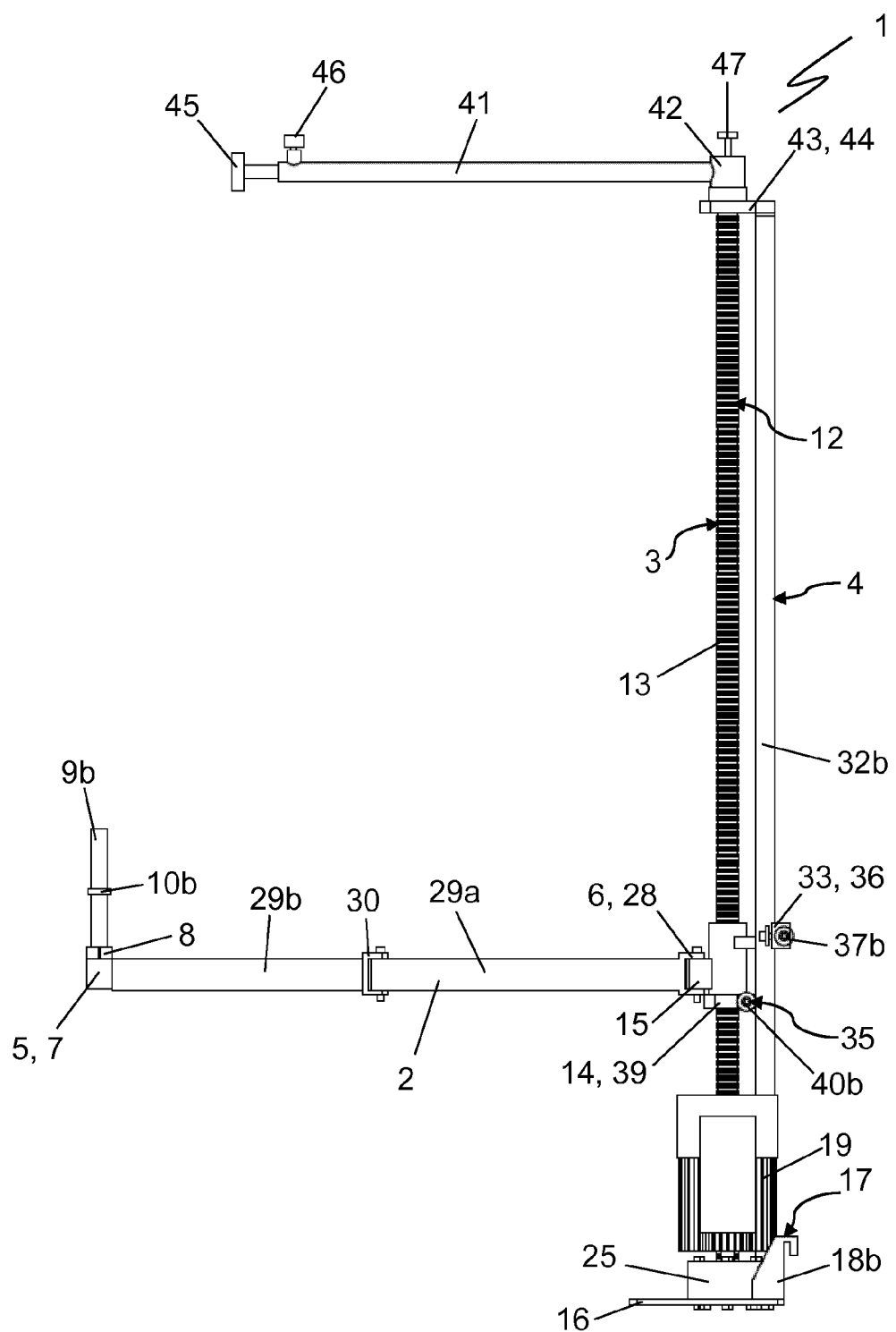
FIG. 5 is the wind turbine apparatus as shown in FIG. 4 with the arm at a lower position.
Figure 6:
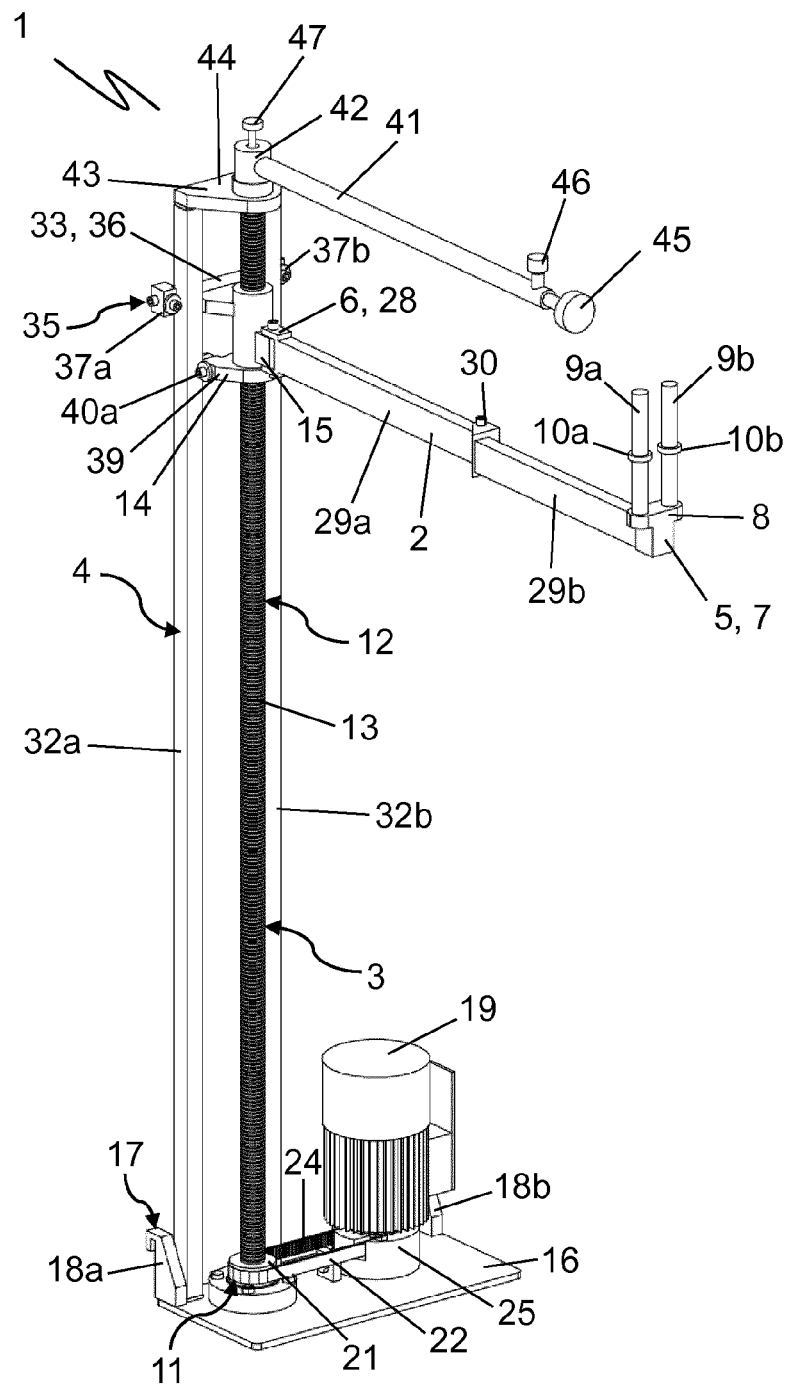
FIG. 6 is a perspective view of the wind turbine apparatus shown in FIG. 2.
Figure 7:
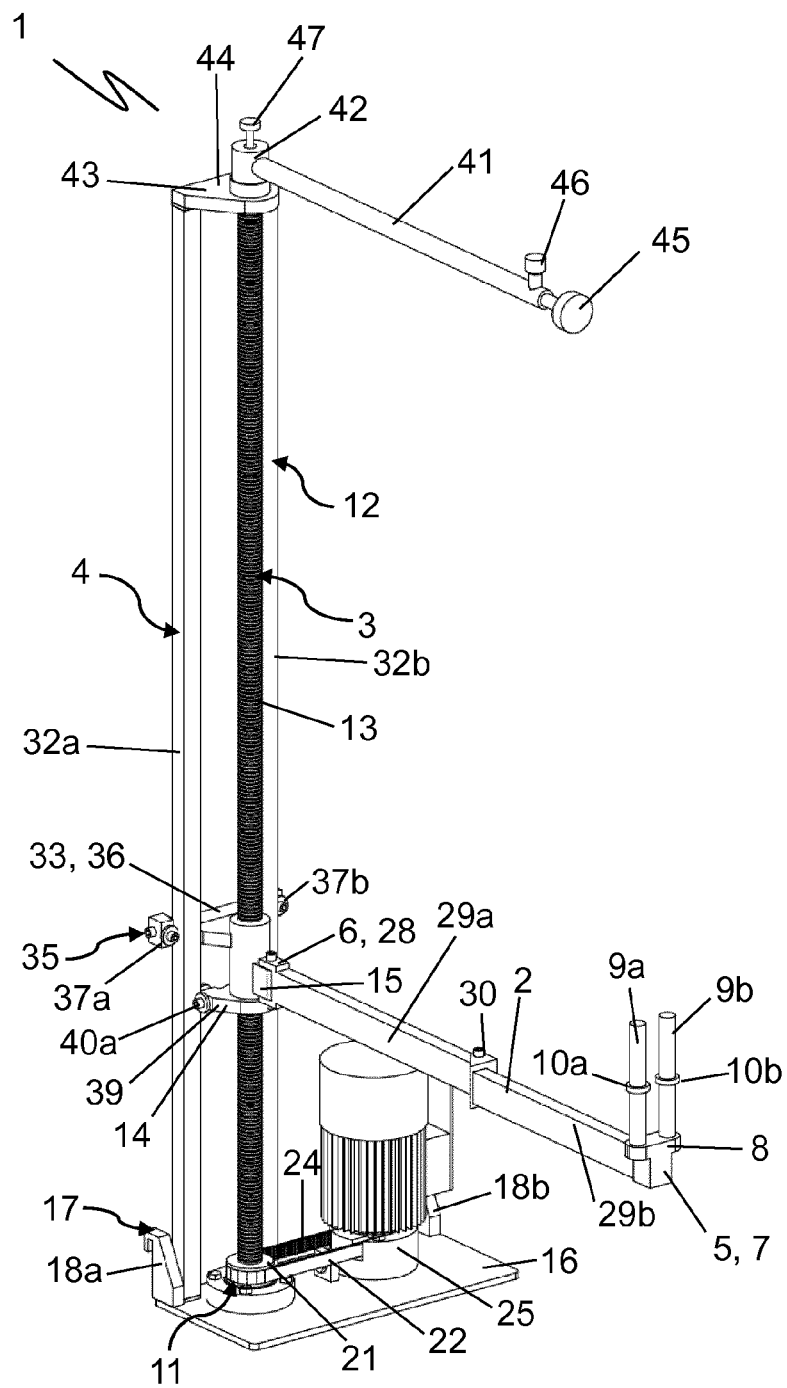
FIG. 7 is the wind turbine apparatus as shown in FIG. 6 with the arm at a lower position.

In the drawings there is shown an apparatus for use with a wind turbine indicated generally by reference numeral 1, which can support the weight of a yaw brake caliper and can raise or lower a yaw brake caliper. The wind turbine apparatus 1 has an arrangement 17 for mounting the wind turbine apparatus 1 to a wind turbine. The arrangement 17 for mounting the wind turbine apparatus 1 enables the wind turbine apparatus 1 to be mounted within the wind turbine, at the top of the tower where the tower meets the nacelle. Specifically, beneath the location of the yaw system. The arrangement 17 for mounting the wind turbine apparatus 1 is further designed such that the wind turbine apparatus 1 can be releasably fixedly mounted to a wind turbine. This enables the wind turbine apparatus 1 to be mounted but also easily repositioned as required. The wind turbine apparatus 1 further has an upright support arrangement 4, formed from steel, and a load bearing arrangement, which, in this embodiment, is provided be an arm 2, for bearing the load of the brake caliper when in use. The arm is formed from aluminium, although it could be formed from other suitable materials such as steel, and is adaptable for engagement with a torque drill (not shown) or a wind turbine yaw component (not shown). The wind turbine apparatus 1 further has an arrangement 3 for raising and lowering the arm. The arrangement 3 is formed from steel in this embodiment, although other suitable materials may be used provided they provide the necessary strength.

Figure 8:
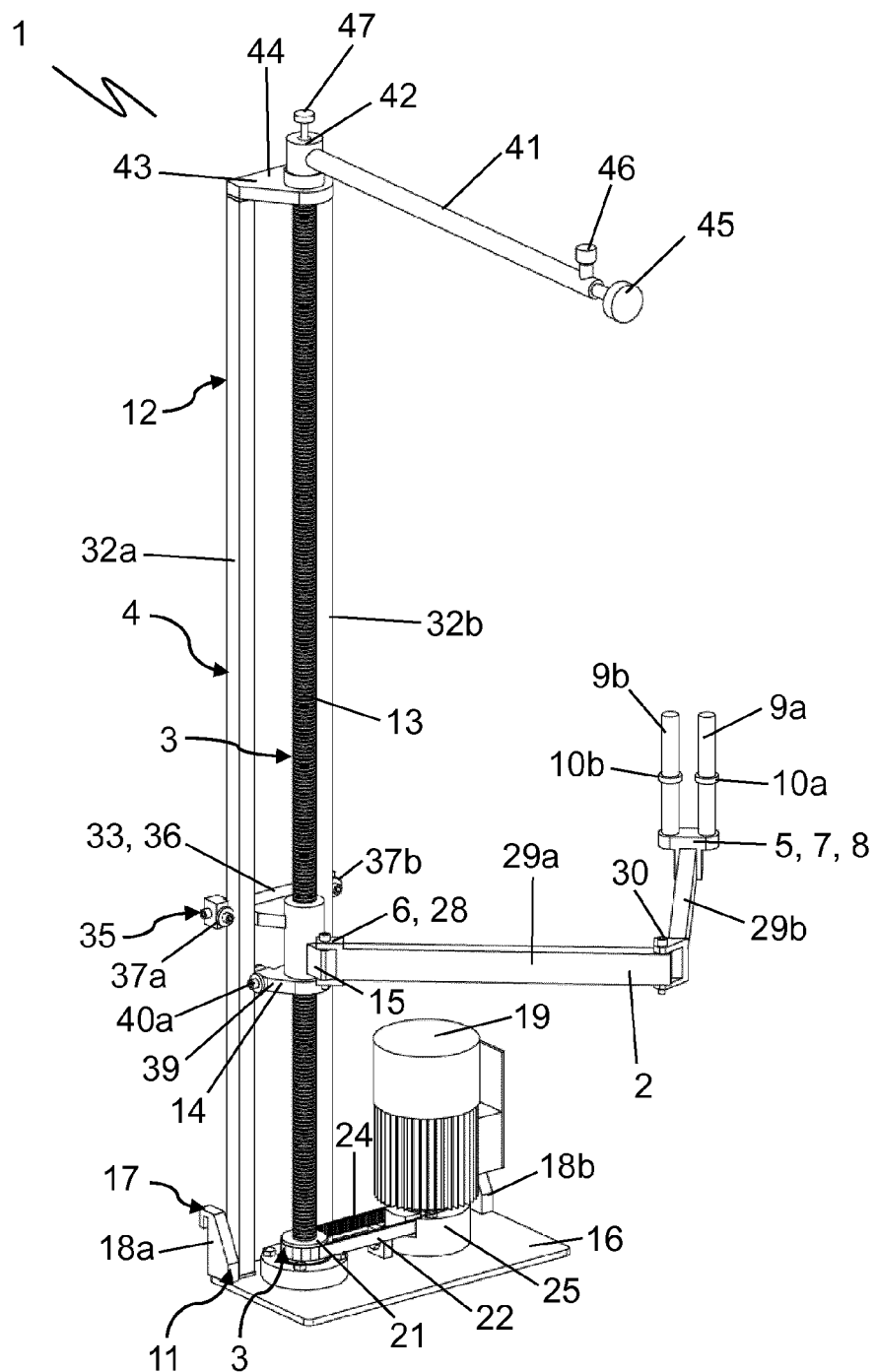
FIG. 8 is the wind turbine apparatus as shown in FIG. 7 with the arm contracted inwards via pivoting at the hinge.
Figure 9:
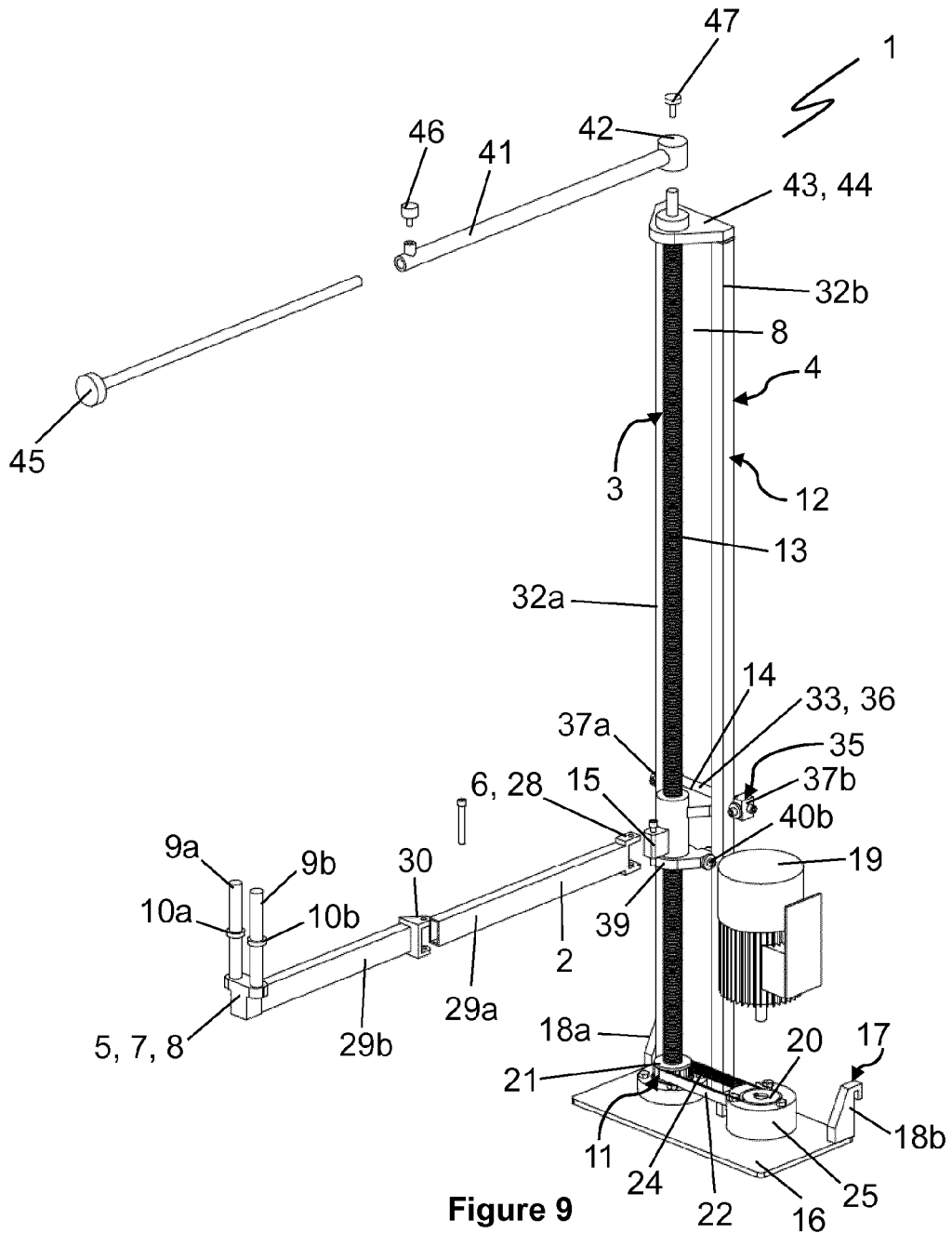
FIG. 9 is an exploded perspective view of the wind turbine apparatus.
Figure 10:
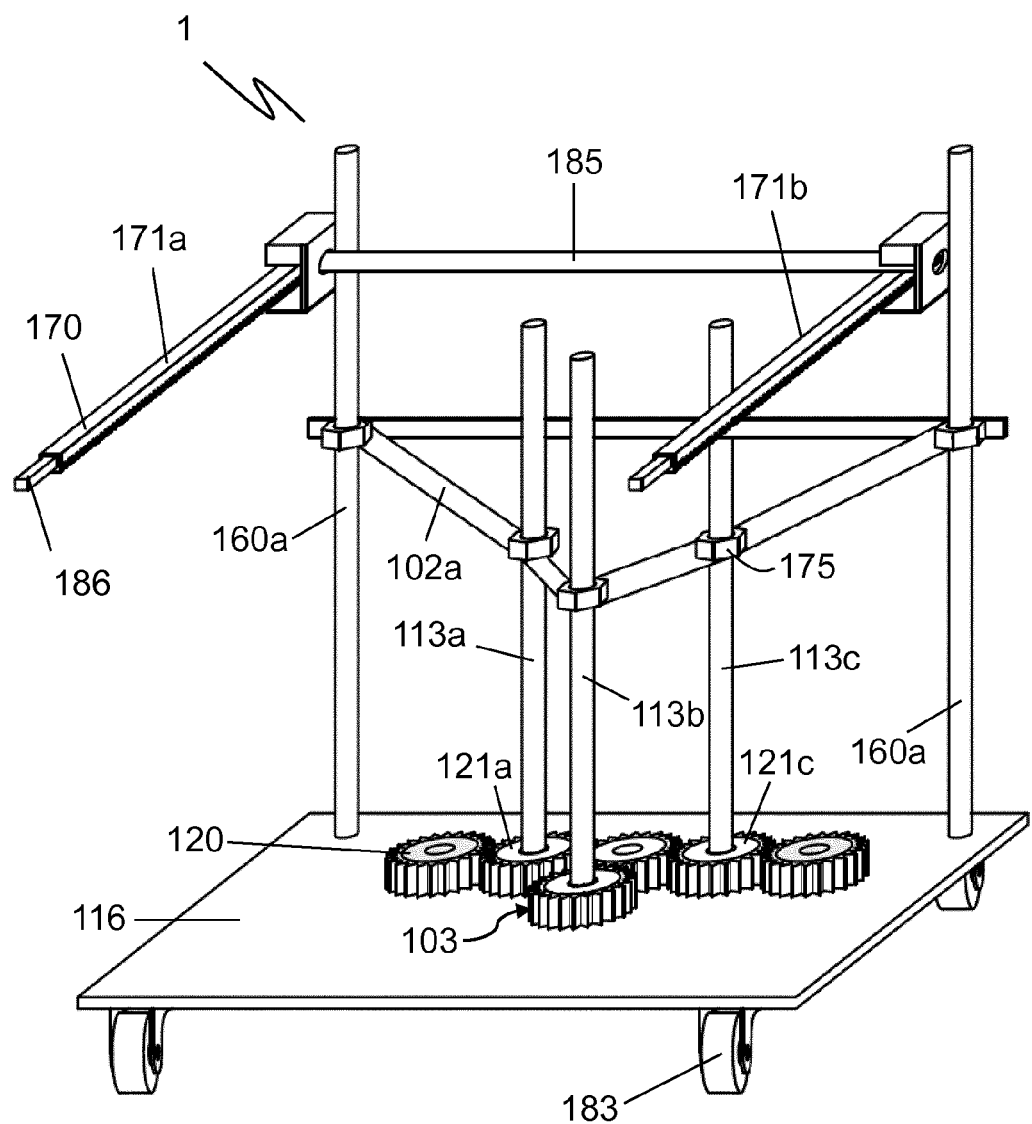
FIG. 10 is a perspective view of a further embodiment of a wind turbine apparatus according to the invention.
Figure 11:
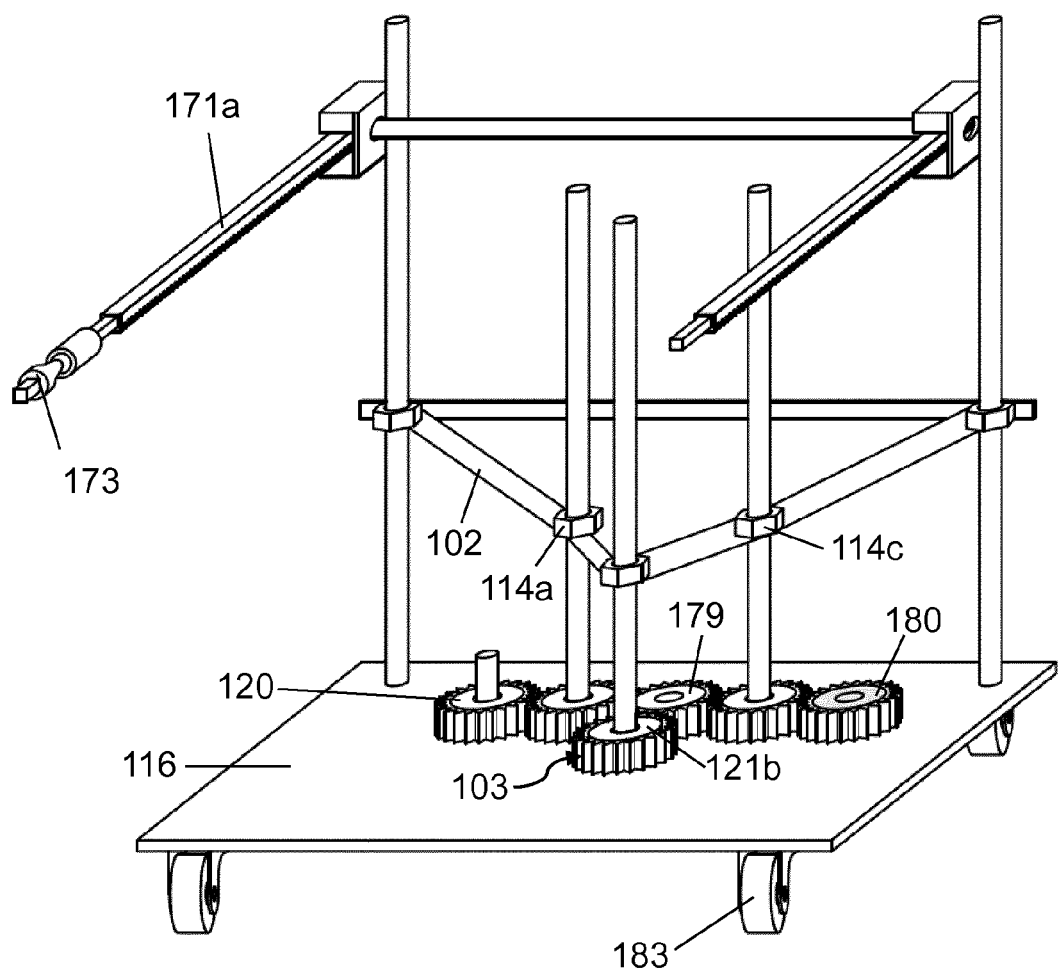
FIG. 11 is a further perspective view of the wind turbine apparatus of FIG. 10.
Figure 12:
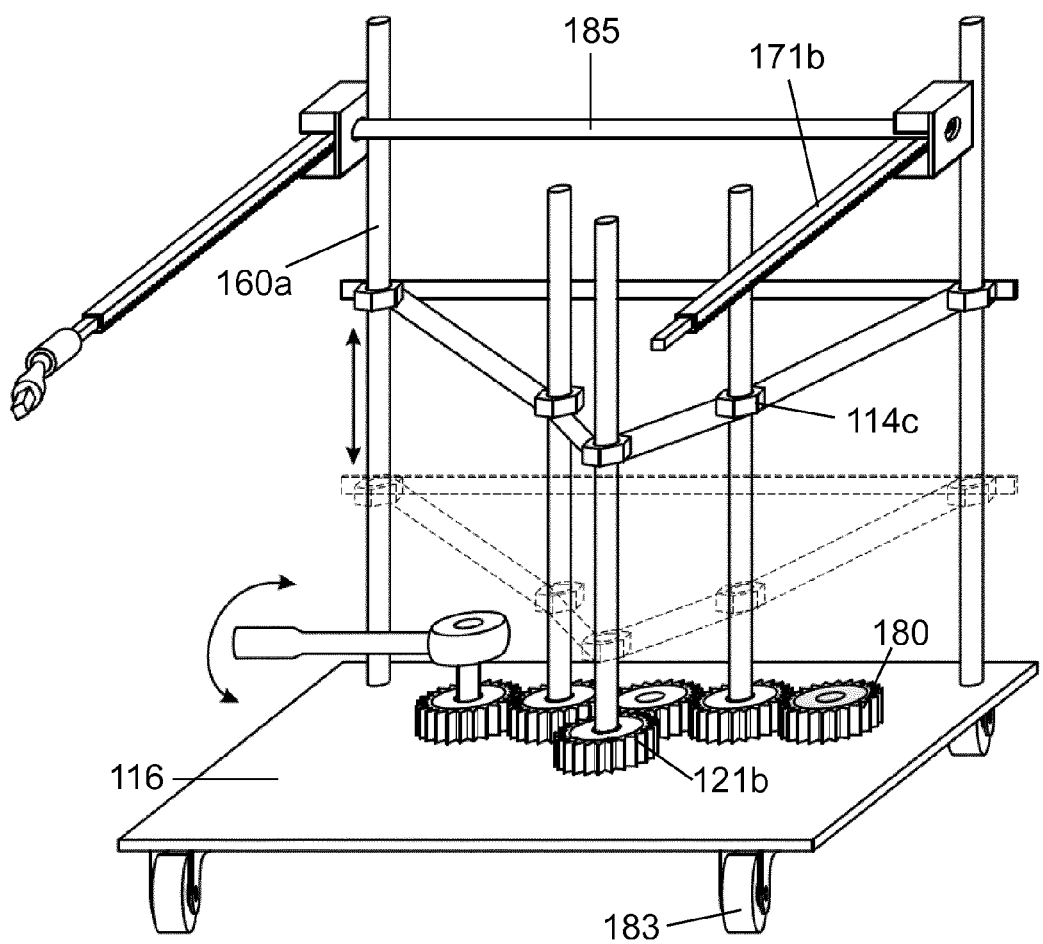
FIG. 12 is a further perspective view of the wind turbine apparatus of FIG. 10. The arrows illustrate the direction of movement of parts of the wind turbine apparatus.
Figure 13:
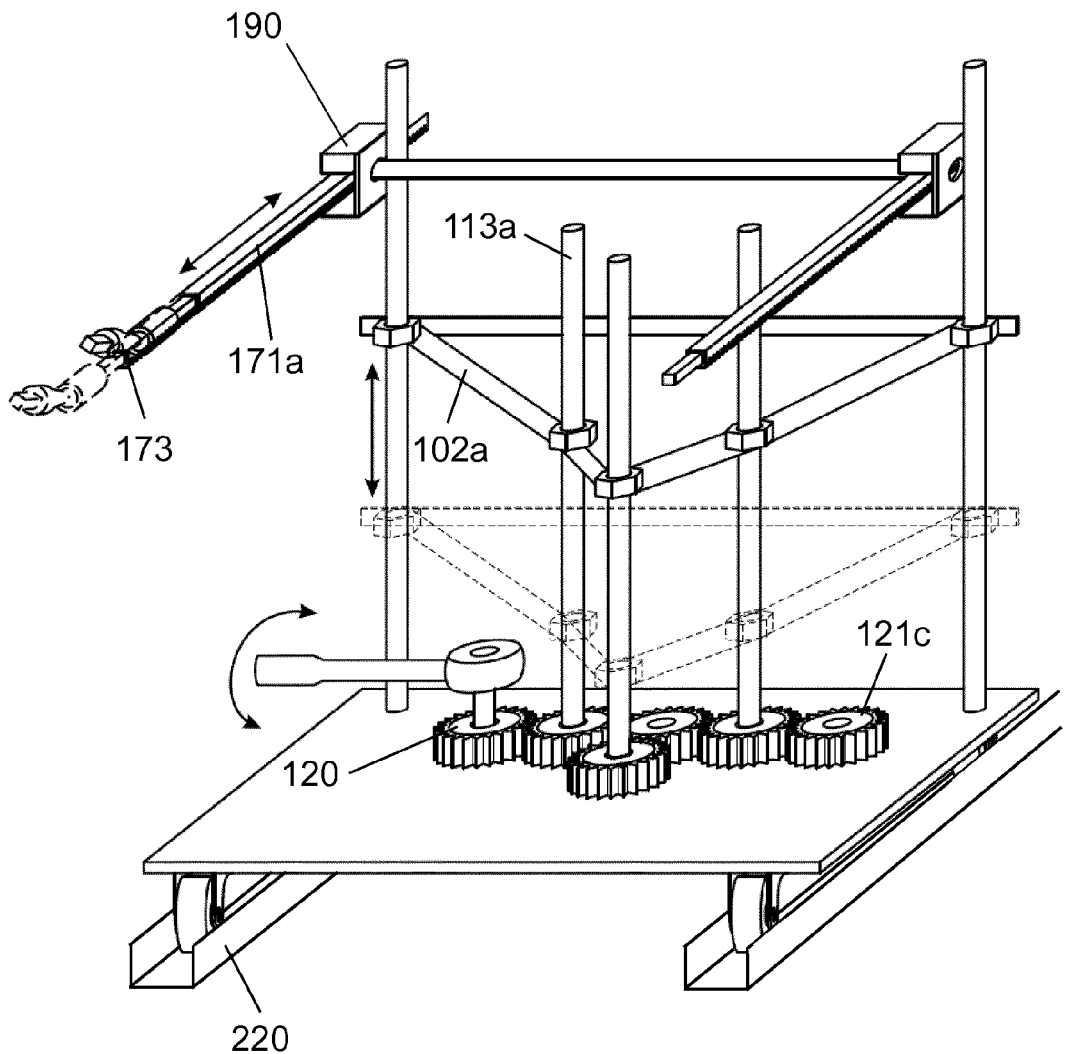
FIG. 13 is a further perspective view of the wind turbine apparatus of FIG. 10. The arrows illustrate the direction of movement of parts of the wind turbine apparatus.
Figure 14:
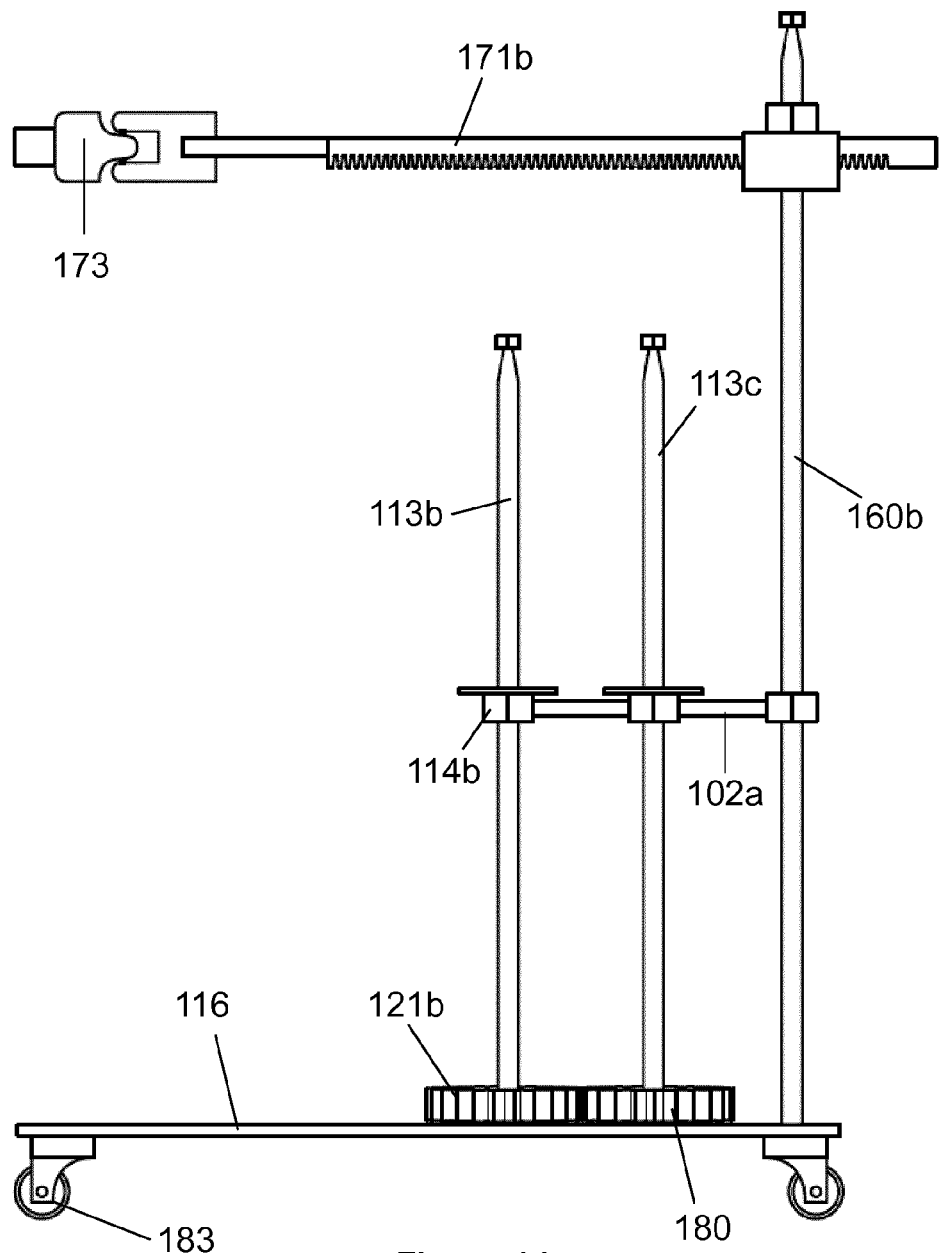
FIG. 14 is an elevated left side view of the wind turbine apparatus of FIG. 10.
Figure 15:
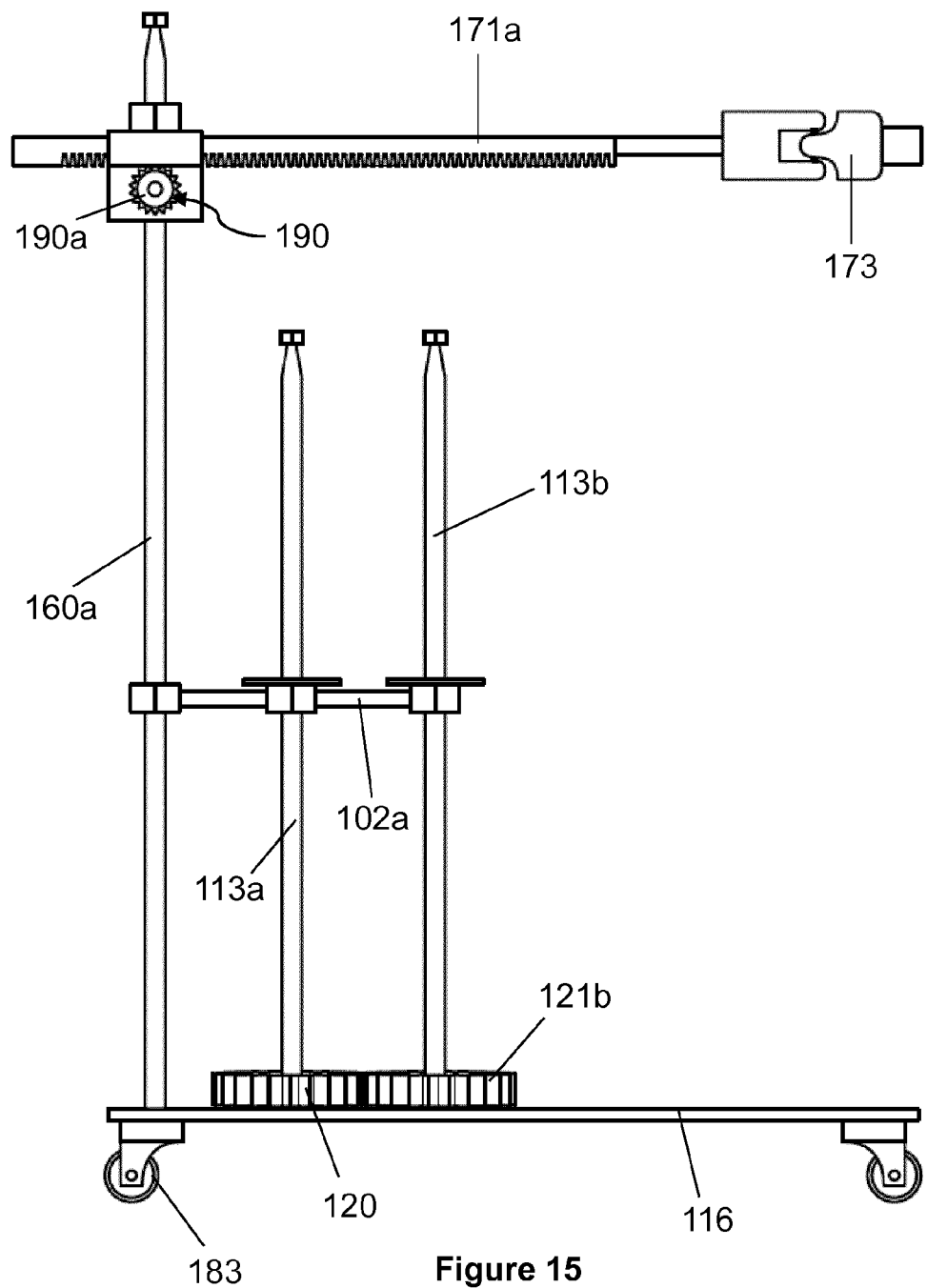
FIG. 15 is an elevated right-side view of the wind turbine apparatus of FIG. 10.
Figure 16:
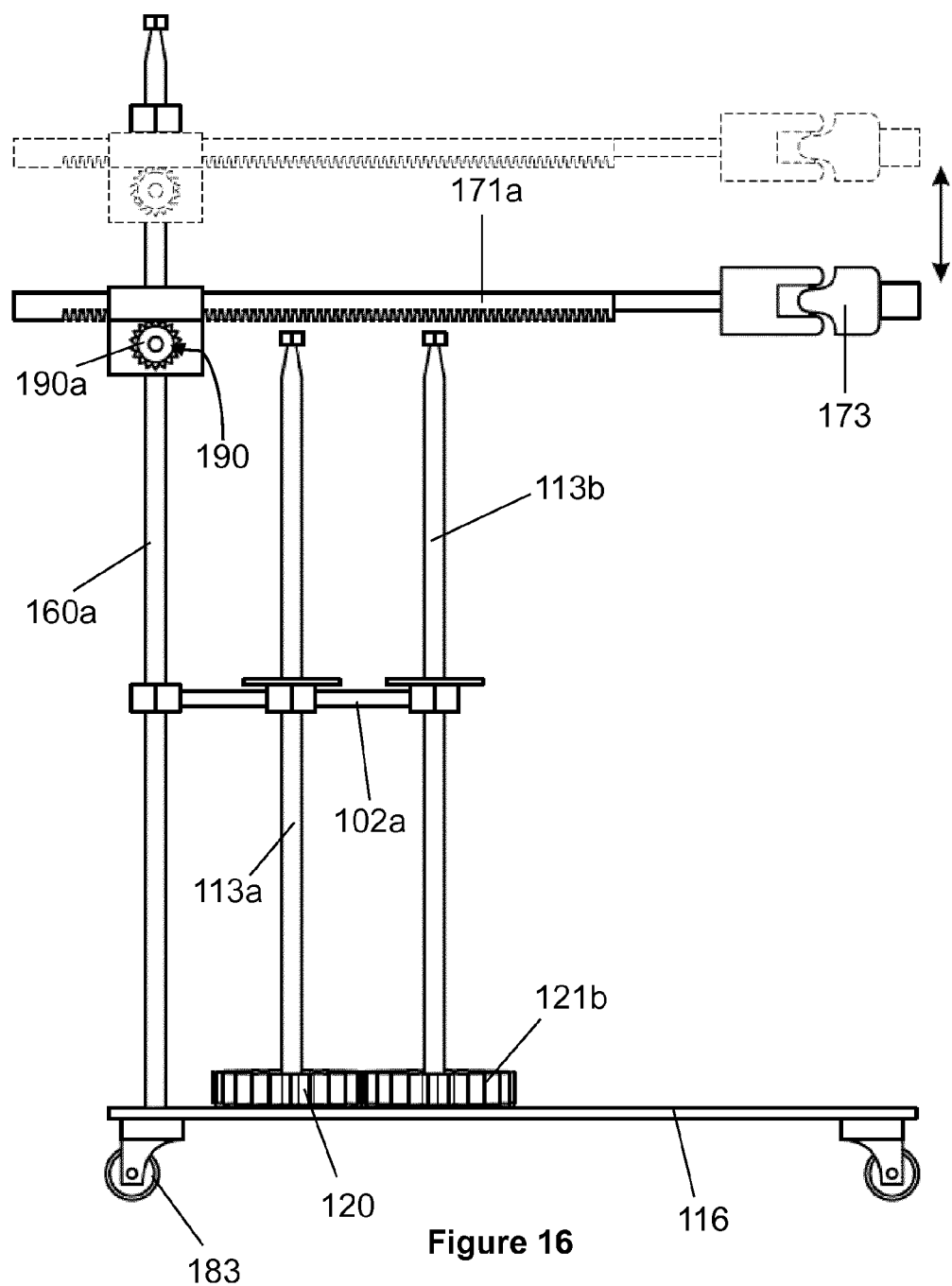
FIG. 16 is an elevated right-side view of the wind turbine apparatus of FIG. 10. The arrow shows the direction of movement of a part of the wind turbine apparatus.
Figure 17:
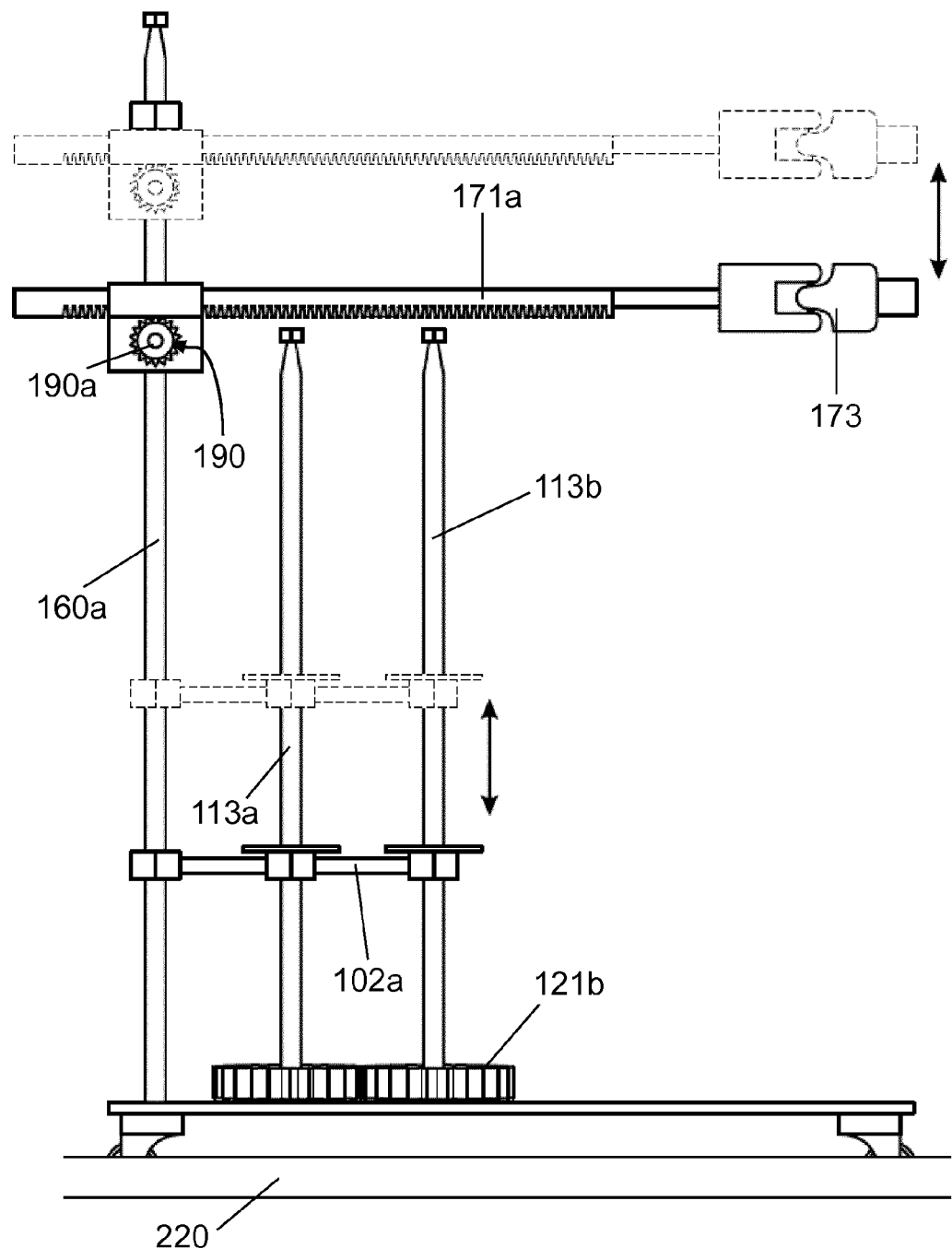
FIG. 17 is an elevated right-side view of the wind turbine apparatus of FIG. 10. The arrows show the direction of movement of parts of the wind turbine apparatus.

The arm 2 is articulated, extends from the arrangement 3 for raising and lowering the arm, and can extend or contract about a lateral axis. The arm 2 can contract towards the arrangement 3 for raising and lowering the arm, as shown in FIG. 8, or be extended fully outwards as shown in FIGS. 1 to 7. It is further adaptable for engagement with a yaw brake caliper (not shown), being operable to engage and move a yaw brake caliper. Further, the arm 2 can support a yaw brake caliper above a platform surface of a wind turbine without having any support structures being directly below the yaw brake caliper, as the upright support arrangement 4 is anchored at a distance from the fully extended arm 2. This is advantageous when, for example, an access opening is directly beneath a yaw brake caliper and so it is not possible to locate support structures of a wind turbine apparatus 1 directly beneath the yaw brake caliper.

The arm 2 has an adaptable utility apparatus 5 formed from aluminium that is adaptable to engage with a wind turbine yaw component. The arm 2 further has a first terminal end 6 located at the arrangement 3 for raising or lowering the arm 2 and a second terminal end 7, the adaptable utility apparatus 5 being located at or about the second terminal end 7. The arrangement 3 for raising and lowering the arm 2 is operable to raise or lower the adaptable utility apparatus 5. In the embodiment shown in FIGS. 1 to 8, the adaptable utility apparatus 5 is fitted with a yaw brake engagement tool 8, formed from aluminium. The yaw brake engagement tool 8 has two, spaced apart prongs 9a, 9b that are shaped and sized to correspond to openings in a yaw brake caliper, having circular cross-sections, such that the prongs 9a, 9b can be inserted into a yaw brake caliper. The two prongs 9a, 9b each have a shoulder 10a, 10b that are situated centrally along the prongs 9a, 9b.

The arrangement 3 for raising and lowering the arm 2 has a drive arrangement 11, which is operable to raise or lower the arm 2. The wind turbine apparatus 1 further has an upright guide apparatus 12 that guides movement of the arm 2 in a vertical direction. When the drive arrangement 11 is operated it moves the arm 2, the movement being guided by the upright guide apparatus 12. The upright guide apparatus 12 further has an elongate, rotatable, threaded spindle 13. The spindle 13 is formed from specialized tempered steel, although other suitable spindles could be used. Operation of the drive arrangement 11 rotates the threaded spindle 13 and this moves the arm 2 along the upright guide apparatus 12. The arrangement 3 for raising and lowering the arm involves a carriage 14, formed form steel and further having an arm engagement member 15. The carriage 14 is in operable engagement with the threaded spindle 13. The arm engagement member 15 has a tube-shaped portion which has an interior thread that is engaged with the threaded spindle 13. Rotating the threaded spindle 13 moves the carriage 14 and the arm engagement member 15 along the threaded spindle 13.

The wind turbine apparatus 1 has a base 16, formed from aluminium but could equally be formed from any other suitable material, that forms a part of the upright support arrangement 4. The base 16 defines the bottom of the upright support arrangement 4 and the upright guide apparatus 12 is connected to and extends from the base 16 in an orientation that is perpendicular to the plane of the base 16. The base 16 is planar and rectangular. The arrangement 17 for mounting the wind turbine apparatus 1 to a wind turbine surface is disposed on the base 16 and is operable to mount the base 16 to a wind turbine surface. The arrangement 17 for mounting the wind turbine apparatus 1 involves two steel spaced apart hooks 18a, 18b that extend upwards from the base 16 and are dimensioned to be hooked onto a part of a wind turbine (not shown).

The drive arrangement 11 has an electrically-powered motor 19 that is operable to drive rotation of the threaded spindle 13. The motor 19 is disposed on the base 16. The drive arrangement 11 has a driving member 20 and a driven member 21, both of which are steel sprocket wheels, the driving member 20 is operable to drive rotation of the driven member 21. The driving member 20 is spaced apart from the driven member 21 and they are connected by a closed loop 22, the closed loop 22 being a rubber composite belt having teeth 24, for engaging with and moving the driving member 20 and driven member 21. The driven member 21 is positioned at the bottom of the upright guide apparatus 12 and forms a part of the upright guide apparatus 12. Both the driving member 21 and the driven member 21 are situated proximal to the base 16 and are fixed to the base 16. The motor 19 is operable to rotate the driving member 20, this in turn rotates the closed loop 22 which then rotates the driven member 21 thereby causing the threaded spindle 13 to rotate. The drive arrangement 11 has a housing 25, formed from aluminium but which could be equally formed from any other suitable material, which houses part of the motor 19, the driving member 20 and a part of the closed loop 22. The housing 25 extends upwards from the base 16 and has a circular cross-section.

The arm 2 is perpendicular to the upright guide apparatus 12 and is pivotally engaged with the upright guide apparatus 12. The arm engagement member 15 has a hinge 28, formed from aluminium but which could be equally formed from any other suitable material, enabling the arm 2 to pivot about the arm engagement member 15 thereby moving the arm 2 through a horizontal axis. The arm 2 has two arm portions 29a, 29b that are hingedly connected via an arm hinge 30. The arm portions 29a, 29b can move horizontally relative to one another via the hinge 30, but not vertically relative to one another. The arm hinge 30 is located between the first terminal end 6 and the second terminal end 7 of the arm 2. In use, the two arm portions 29a, 29b are coplanar.

The upright support arrangement 4 has two, spaced apart elongate support members 32a, 32b. The elongate support members 32a, 32b are formed from steel and having a square cross section although alternative materials and shapes could be used. The two elongate support members 32a, 32b extend upwards from the base 16 and proximal and parallel to the threaded spindle 13. The upright support arrangement 4 provides support to the carriage 14. The two elongate support members 32a, 32b and the threaded spindle 13 are arranged in a triangular fashion such that each of the elongate support members 32a, 32b and the threaded spindle 13 define a corner of the triangle. The carriage 14 is positioned on the two elongate support members 32a, 32b and the threaded spindle 13.

The carriage 14 further has a bracket 33 that is engaged with the two elongate support members 32a, 32b, thereby mounting the carriage 14 to the two elongate support members 32a, 32b. The bracket 33 is fitted around, and is slidably engaged with, the two elongate support members 32a, 32b. The bracket 33 has an arrangement 35 for preventing lateral movement of the carriage 14, the arrangement 35 having a rear component 36. The two elongate support members 32a, 32b are positioned between the rear component 36 and the threaded spindle 13, the rear component 36 extending between and pressing against the two elongate support members 32a, 32b. The rear component 36 further has two stoppers 37a, 37b positioned around the two elongate support members 32a, 32b such that the elongate support members 32a, 32b are between the two stoppers 37a, 37b; the stoppers 37a, 37b being at a distance to prohibit lateral movement of the bracket 33.

The arrangement 35 for preventing lateral movement of the carriage 14 has a front component 39 disposed on the two elongate support members 32a, 32b at location opposing the position of the rear component. The two elongate support members 32a, 32b are located between the rear component 36 and the front component 37. The front component 37 has two protrusions 40a, 40b which are each positioned to abut the two elongate support members 32a, 32b, respectively. The two protrusions 40a, 40b prevent movement of the bracket 33 in a direction away from the location of the threaded spindle 13.

The wind turbine apparatus 1 further has a lateral support member 41, formed from steel, that extends perpendicularly to the upright guide apparatus 12. The lateral support member 41 is extendible and contractible and operable to engage with a wind turbine support structure. The lateral support member 41 is a telescopic elongate rod, the telescopic configuration operable to extend or contract the lateral support member 41. Also provided is a screw 46 positioned on the elongate rod that can be tightened to prevent the lateral support member from extending/contracting and loosened to enable extension/contraction. The lateral support member 41 further has an abutment member 45 for abutting a wind turbine structure. This stabilises the wind turbine apparatus 1 by pressing against a wind turbine structure so that when a weight is added to the arm, the lateral support member 41 can prevent the wind turbine apparatus 1 from tipping substantially towards the wind turbine structure that is in abutting engagement with the lateral support member 41. In one embodiment the lateral support member 41 is operably coupled to one of the brake calipers above the lateral support member 41 by a mechanical fixing arrangement having a first female member formed for attachment to the lateral support member and a second female member formed for acting as a washer on a bolt for fixing the caliper to the tower ceiling. The mechanical fixing arrangement is a double ring arrangement with the main plane of the rings perpendicular to one another. Advantageously, this greatly stabilizes the wind turbine apparatus 1 at times when it is raising lowering or holding the weight of a caliper.

The wind turbine apparatus 1 has a lateral support member pivot 42 about which the lateral support member 41 can pivot. The upright guide apparatus 12 has an upper terminal end 43 and a stop member 44, formed form aluminium, located at the upper terminal end 43. The two elongate support members 32a, 32b are joined to the stop member 44 and the lateral support member pivot 42 is located at the stop member 44, the stop member 44 being disposed between the lateral support member pivot 42 and the threaded spindle 13. The lateral support member 41 is secured to the upright guide apparatus 12 via an adjustable, hardened steel screw 47 that can be tightened or loosened to adjust the freedom of movement of the lateral support member 41.

The wind turbine apparatus 1 has an arrangement (not shown) for controlling movement of the arm 2. The control arrangement is operable to control the arrangement 3 raising and lowering the arm 2. The control arrangement can control the drive arrangement 11 and the motor 19 and has a control panel (not shown) operably connected to the motor 19. The control panel has a user interface (not shown) enabling the user to input commands to activate the motor 19 and therefore move the arm 2 up or down along the upright guide apparatus 12.

In use, the wind turbine apparatus 1 can be operated to assist in the installation, repair and replacement of wind turbine yaw brake calipers (not shown). Firstly, the wind turbine apparatus 1 is anchored to a structure of the wind turbine by the arrangement 17 for mounting the wind turbine apparatus. The lateral support member 41 can provide additional support by extending or contracting the lateral support member 41 such that the abutment member 45 abuts against a wind turbine structure. This will prevent the wind turbine apparatus 1 from tipping in a direction towards the surface which the lateral support member 41 is abutting against.

To remove a yaw brake caliper from a yaw system of a wind turbine, the engineer must first loosen the bolts of the yaw brake caliper. Typically, this is done using a torque drill. The engineer can utilize the wind turbine apparatus 1 in this process by first lowering the arm 2 to the bottom of the upright guide apparatus 12. This is done by inputting the command in the control panel thereby engaging the motor 19, causing rotation of the driving member 20, driven member and threaded spindle 13. This in turn causes the carriage 14 to move down the threaded spindle 13. Once the arm 2 is lowered the engineer can fit a torque drill (not shown) to the adaptable utility apparatus 5. The arm 2 is then raised by inputting the command in the control panel. If necessary, the engineer can bend the arm about the hinge 28 and the arm hinge 30 to line the torque drill (not shown) up with a brake caliper, the arm 2 can then be raised to engage the torque drill with the brake caliper. The process is repeated until the bolts are sufficiently loosened to remove the bolts and release the brake caliper. The arm 2 is then lowered as previously and the torque drill changed for the yaw brake engagement tool 8. The yaw brake engagement tool 8 is raised up to the brake caliper and adjusted laterally about the hinge 29 and arm hinge 30 such that the prongs 9a, 9b engage the brake caliper. The engineer can then further adjust the hinge 29 and/or arm hinge 30 such that the brake caliper slides out of position. The wind turbine apparatus 1 fully bears the weight of the brake caliper. The engineer then inputs a command via the control panel for the arm 2 to be lowered thereby lowering the brake caliper. In an embodiment not shown, the adaptable utility apparatus 5 is pivotable thus enabling the brake caliper to be rotated when the arm 2 reaches the surface of the wind turbine platform to set the brake caliper on the surface. The prongs 9a, 9b can be slid away from the brake caliper and used to raise a new brake caliper into position if required. Using the wind turbine apparatus 1, the engineer is not required to lift either a torque drill or a brake caliper throughout any yaw brake installation or maintenance processes.

Referring now to FIGS. 11-17 there is shown a further embodiment of the wind turbine apparatus, indicated generally by reference numeral 101. The wind turbine apparatus 101 has three spaced apart upright guide apparatuses 113a-c. Alternatively, less or more than three upright guide apparatuses 113a-c as required. The spacing between the upright guide apparatuses 113a-c is equal to that of the spacing between the bolt apertures of a yaw brake caliper (not shown), such that the upright guide apparatuses 113a-c can be inserted into the bolt apertures when the bolts have been removed. The load bearing arrangement 102 is formed as a platform 102a that extends laterally between the upright guide apparatuses 113a-c, with each upright guide apparatuses 113a-c passing through the platform 102a. The platform 102a in this embodiment is formed from a plurality of beams that extend between the upright guide apparatuses 113a-c. The platform 102a is connected to the upright guide apparatuses 113a-c via bearings 175, such that when the bearings 175 rotate, e.g. when the upright guide apparatuses 113a-c rotate, the platform 102a moves up or down but does not rotate.

The platform 102a further extends between two spaced apart upright support members 160a, 160b, with the upright guide apparatuses 113 being positioned between the upright support members 160a, 160b. The platform 102a is slidably arranged around the upright support members 160a, 160b such that it can move along the upright support members 160a, 160b, The upright support members 160a, 160b do not rotate and so do not impart motion to the platform 102a, but are for the purpose of providing strength and stability to the platform 102a.

The arrangement 103 for raising and lowering the platform 102a involves each upright guide apparatus 113a-c comprising a driven member 121a-c fixed relative to each upright guide apparatus 113a-c, at the base of each upright guide apparatus 113a-c. In this embodiment, the driven members 121a-c are interlocking cogwheels and each upright guide apparatuses 113a-c is a spindle that is screwed into the axis of the cogwheel. The driving member 120 is a further interlocking cogwheel, being interlocked with a first of the three driven members 121a-c, that can be rotated manually using a ratchet (e.g. see FIG. 12), or by a drive means such a motor or drill (not shown). The cogwheels need not be directly interlocked, but could be connected by intermediate cogwheels that transfer rotation from the driving member 120 to and between the driven members 121a-c, The embodiment in FIGS. 10-17 has an intermediate cogwheel 179 that is located centrally between, and interlocks with, all three driven members 121a-c. The wind turbine apparatus 101 further has a supporting cogwheel 180 interlocked with the furthest driven member 121c from the driving member 120. When the driving member 120 is rotated clockwise, the adjacent driven member 121a rotates anticlockwise, the intermediate cogwheel 179 is rotated clockwise and in turn imparts anticlockwise rotation on the remaining driven members 121b, 121c. The intermediate cogwheel 179 thereby further functions such that all three upright guide apparatuses 113a-c rotate in the same direction.

In this embodiment, there are three carriages 114a-c, that are formed as a part of the platform 102a and contain the aforementioned bearings, each being arranged on the upright guide apparatuses 113a-c such that the rotation of the upright guide apparatuses 113a-c results in vertical movement of the carriages and therefore the platform 102a.

In this embodiment, the base 116 comprises wheels 183. The wind turbine apparatus 101 further has a mounting arrangement 170 for mounting the wind turbine apparatus 101 to a surface. In particular, the mounting arrangement 170 is suitable for temporarily mounting the wind turbine apparatus 101 to a tower of a wind turbine. When mounted, the wind turbine apparatus 101 can be moved laterally, being moved via the wheels on the base 116. As the brake calipers can be heavy (>100 kg), the mounting arrangement 170 is further adapted to assist in laterally moving the upright guide apparatuses 113a-c; for example, to move them away from a brake disk in use. In the embodiment shown in FIGS. 10-17, the mounting arrangement 170 involves a pair of mounting support members 171a, 171b. The mounting arrangement 170 includes a by a transverse support member 185 that extends between and supports the mounting support members 171a, 171b. Each mounting support member 171a, 171b is movably fixed proximal the upright guide apparatuses 113a-c, by being fixed to the upright support members 160a, 160b. It should be understood that the mounting support members 171a, 171b could alternatively be fixed to any component part of the wind turbine apparatus 101 that is in turn directly or indirectly fixed to the upright guide apparatuses 113a-c.

The mounting support members 171a, 171b can be arranged to extend perpendicularly relative to the upright guide apparatuses 113a-c. They each have attachment means 186 at or about one end to enable the mounting support members 171a, 171b to be releasably fixed to a surface, for example, a part of a wind turbine tower. The mounting arrangement 170 further involves a mechanism 190 to extend or contract the portion of mounting support members 171a, 171b located between the attachment means 186 to where it is fixed proximal the upright guide apparatuses 113a-c, i.e., on the upright support members 160a, 160b. In the illustrated embodiment, the mechanism 190 is a rack and pinion whereby the mounting support members 171a is the rack, and the pinion 190a is located proximal the upright support members 160a, 160b and it can be rotated using an auxiliary drive means such as an electrically powered drill (not shown). The mechanism 190 is movably fixed to the upright support member 160a and can be moved up or down along the upright support members 160a, 160b to adjust the distance between the base 116 and the mounting arrangement 170. Rotating the pinion 190a in one direction results in the distance between the attachment means 186 and the point at where the mounting support member 171a is movably fixed proximal the upright guide apparatuses 113a-c being extended, and rotation in the opposite direction results in contraction. The mounting support members 171a further can be fit with a pivot joint 173 as shown in FIGS. 12-17. The pivot join 173 enables further adjustments of the position of the base 116 relative to the structure to which the wind turbine apparatus 101 is mounted. While two mounting support members 171a, 171b are described here it should be understood that one could be used, or more than two as required or desired.

In use, the bolts of a yaw brake caliper are initially removed as hereinbefore described. Next, the wind turbine apparatus 101 is mounted to the wind turbine via the attachment means 186 on the mounting arrangement 170. The upright guide apparatuses 113a-c are removed from the base 116 by unscrewing them from the driven members 121a-c and lifting them away from the base 116. The upright guide apparatuses 113a-c are then inserted into bolt openings of the yaw brake caliper, and the base 116 is positioned below the upright guide apparatuses 113a-c by operating the mechanism 190 to contract the mounting support members 171a, 171b and making lateral adjustments of the position of the base 116 if necessary via the pivot joint 173 on the mounting arrangement 170. The lower end of the upright guide apparatuses 113a-c are then reattached to the driven members 121a-c and the base 116. The driving member 120 is rotated to raise the platform 102a until it abuts the yaw brake caliper.

The mechanism 190 to extend the mounting support members 171a, 171b is then operated to move the base 116 in towards the centre of the tower thereby moving the caliper off the brake disk, the platform 102a then bearing the weight of the caliper. The caliper is then lowered by rotating the driving member 120 in an opposite direction and the brake caliper can then easily be inspected or repaired by the workers. The steps are then reversed to reposition the caliper on the brake disk.

Figure 18:
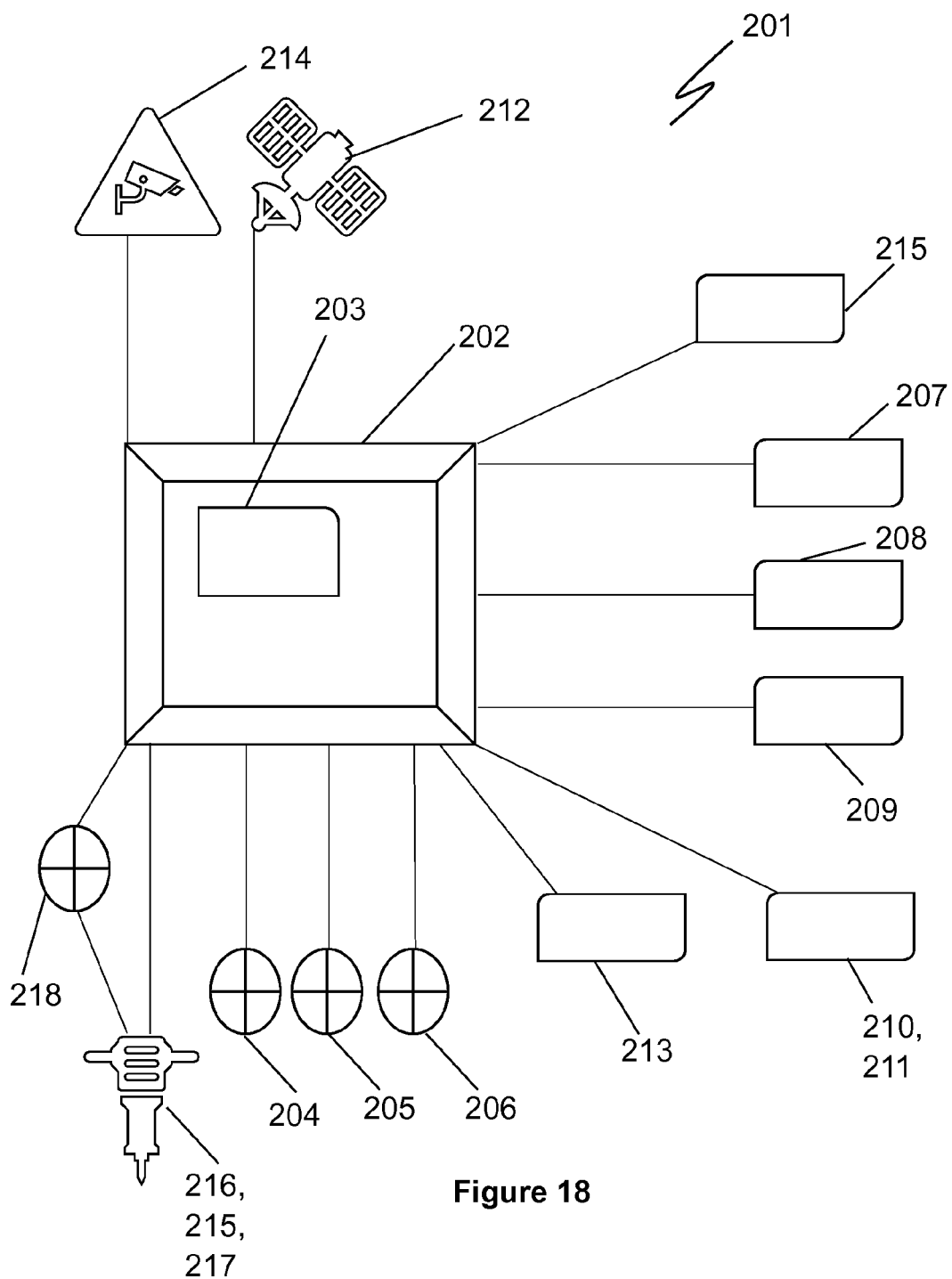
FIG. 18 is a schematic of an automation system for a wind turbine apparatus according to the invention.

Referring to the drawings and now to FIG. 18, there is provided an automation system indicated generally by the reference numeral 201 for controlling the operation of a wind turbine apparatus 1 in the tower of a wind turbine for performing periodic maintenance and repair of the brake system of the wind turbine. The automation system 201 involving a guide track 220 (see FIGS. 13 and 17) for guiding motion of the wind turbine apparatus 1 around the platform of the tower relative to the brake system. In the embodiment shown in FIGS. 13 and 17, the wind turbine apparatus 101 has wheels 183 that are engaged with the track 220 for movement of the wind turbine apparatus 101 along the track. However, any suitable arrangement for travelling along the guide track 220 could be used. At least one of the wheels 183 can further be powered to power movement of the wind turbine apparatus along the track 220. The automation system 201 having an electronic control unit 202 having a memory 203 storing a coordinate system comprising the potential relative positions of all of the components of the wind turbine, the nacelle braking system and the wind turbine apparatus 1, 101 thereby providing a datum for automated control of all components of the wind turbine apparatus 1, 101. The wind turbine apparatus 1, 101 has sensors 204-206 for determining the position of the wind turbine apparatus 1, 101 and component parts thereof relative to the yaw brakes of the wind turbine in which the wind turbine apparatus is installed. More specifically, the sensors 204 to 206 are on the arrangement 41 for mounting the wind turbine apparatus 1 on the wind turbine, the load bearing arrangement 2, 102 and the wind turbine apparatus carriage arrangement. The sensors 204 to 206 provide feedback to the electronic control unit 201 of the automation system of the actual position of these components relative to the wind turbine and the braking system. The wind turbine apparatus 1, 101, more specifically the automation system 201, further comprises electromechanical actuators 207 to 209 operably coupled to the load bearing arrangement 2, 102, the carriage arrangement and the mounting arrangement 41 for moving these components. The actuators 207 to 209 also being operably coupled to and under the control of the electronic control unit 201. The wind turbine apparatus 1, 101, more specifically the automation system 201 further comprises actuators 210, 211 for the drive assembly 11, 120 being operably coupled to the electronic control unit 201.

Advantageously, the automation of the periodic maintenance of the braking system at the top of the wind turbine means that the costs of this work is dramatically reduced. This is especially significant in offshore wind farms where an operator on a boat can connect in to each wind turbine in turn using telecommunications system 212 to initiate a test of the braking system such as testing the torque of the bolts of the calipers or testing the depth of the calipers via wear sensors 213 on the calipers of the disk brake, the wear sensors 213 of the brake calipers being operably coupled to the ECU 201. Furthermore, the operator on a boat or remotely can connect in to each wind turbine in turn using telecommunications system 212 to view the internal space of the top of the tower as well as the condition of the braking system via one or more cameras 214 mounted on the wind turbine or the wind turbine apparatus 1.

The automation system 201 further involves the wind turbine apparatus 1, 101 being equipped with an electromagnetic braking system 215 for fixing the location of the wind turbine apparatus 1, 101 carriage relative to the guide track 220. The electromagnetic braking system 215 being operably coupled to the electronic control unit 201 so as to be automatically operated.

The automation system 201 further involves automating the adaptable utility apparatus 5 and torque wrench assembly 216 of the wind turbine apparatus 1, 101. The automation system 201 has a tool carousel 217 comprising an adaptable utility apparatus 5 and a torque wrench 216 operably coupled to the electronic control unit 201. The tool carousel, the utility apparatus 5 and the torque wrench have position sensors 218 for detecting their position relative to the brake caliper bolts and bolt holes to allow the electronic control unit 201 to position the utility apparatus in the bolt holes and to allow the torque wrench 216 to locate on the bolts to insert, remove and periodically test the torque of the bolts for maintenance.

In relation to the detailed description of the different embodiments of the invention, it will be understood that one or more technical features of one embodiment can be used in combination with one or more technical features of any other embodiment where the transferred use of the one or more technical features would be immediately apparent to a person of ordinary skill in the art to carry out a similar function in a similar way on the other embodiment.

In the preceding discussion of the invention, unless stated to the contrary, the disclosure of alternative values for the upper or lower limit of the permitted range of a parameter, coupled with an indication that one of the values is more highly preferred than the other, is to be construed as an implied statement that each intermediate value of the parameter, lying between the more preferred and the less preferred of the alternatives, is itself preferred to the less preferred value and also to each value lying between the less preferred value and the intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof as defined in the appended claims.

The invention claimed is:

1. A wind turbine apparatus (1, 101) for use in movement of components of a wind turbine, the wind turbine apparatus comprising an upright support means (4), the upright support means (4) being adaptable to be set on a surface below a load in use, such that the weight of the load is transferred to the surface, the wind turbine apparatus (1, 101) comprising a load bearing means (2, 102) for engaging a load, the load bearing means (2, 102) being operably coupled with the upright support means (4) and being configured to be moveable laterally when bearing a load, and wherein the wind turbine apparatus (1, 101) further comprises a means (3, 103) for raising and lowering the load bearing means (2, 102), wherein the means (3, 103) for raising or lowering the load bearing means (2, 102) comprises an upright guide apparatus (12, 113*a-c*) for guiding movement of the load bearing means (2, 102), the upright guide apparatus (12, 113*a-c*) comprising an elongate rail (13), the elongate rail being a threaded spindle, and wherein the means (3, 103) for raising and lowering the load bearing means (2, 102) comprises a drive means (11) for raising or lowering the load bearing means (2, 102), the drive means (11) being operable to move the load bearing means (2, 102) along the upright guide apparatus (12, 113*a-c*), and wherein the means (3, 103) for raising or lowering the load bearing means (2, 102) comprises one or more carriages (14, 114*a-c*) for carrying the load bearing means (2, 102) along the upright guide apparatus (12, 113*a-c*), the carriage (14, 114*a-c*) being operably engaged with the upright guide apparatus (12, 113*a-c*) characterised in that the drive means (11) is operable to rotate the elongate rail (13) thereby moving the carriage (14, 114*a-c*) and the load bearing means (2, 102) along the elongate rail (13).

2. A wind turbine apparatus (1, 101) as claimed in claim 1, wherein the means (3, 103) for raising or lowering the load bearing means (2, 102) comprises one or more load bearing means engagement members (15), the load bearing means engagement member (15) forming a part of the carriage (14, 114*a-c*), the load bearing means engagement member (15) comprising a tube, the tube comprising an internal thread sized to engage with the threaded spindle.

3. A wind turbine apparatus (1, 101) as claimed in claim 1 wherein the upright support means (4) forms a part of the means (3, 103) for raising and lowering the load bearing means (2, 102).

4. A wind turbine apparatus (1, 101) as claimed in claim 1 wherein the upright guide apparatus (12, 113*a-c*) is sized to be inserted into an opening of a yaw brake caliper.

5. A wind turbine apparatus (101) as claimed in claim 1 wherein the means (103) for raising or lowering the load bearing means comprises a plurality of upright guide apparatuses (113*a-c*).

6. A wind turbine apparatus (101) as claimed in claim 5 wherein the load bearing means (102) extends between, and is support by, the plurality of upright guide apparatuses (113*a-c*).

7. A wind turbine apparatus (1, 101) as claimed in claim 1, the wind turbine apparatus comprising a base (16, 116), the upright support means (4) forming a part of the base (16, 116).

8. A wind turbine apparatus (1, 101) as claimed in claim 7 wherein the upright guide apparatus (12, 113*a-c*) is removable from the base (16, 116).

9. A wind turbine apparatus (101) as claimed in claim 7 wherein the base (116) has wheels (183) for moving the apparatus (101).

10. A wind turbine apparatus (1) as claimed in claim 1 wherein the drive means (11) comprises a motor (19), the motor (19) being operable to drive rotation of the upright guide apparatus (12).

11. A wind turbine apparatus (1, 101) as claimed in claim 1 wherein the drive means (11) comprises a driving member (20, 120) and at least one driven member (21, 121*a-c*).

12. A wind turbine apparatus (1, 101) as claimed in claim 11 wherein the driven member (21, 121*a-c*) is situated at or about the upright guide apparatus (12, 113*a-c*), being operably engaged with, and fixed relative to, the upright guide apparatus (12, 113*a-c*).

13. A wind turbine apparatus (101) as claimed in claim 11 where the driving member (120) and driven member (121*a-c*) are interlocking cogwheels, such that rotation of the driving member (120) results in opposite rotation of the driven member (121*a-c*).

14. A wind turbine apparatus (1, 101) as claimed in claim 1 wherein the load bearing means (2, 102) comprises an arm and/or a platform (2, 102*a*).

15. A wind turbine apparatus (1, 101) as claimed in claim 1 wherein the apparatus comprises a mounting means (17, 170) for mounting the wind turbine apparatus to a surface.

16. A wind turbine apparatus (1, 101) as claimed in claim 1 wherein the wind turbine apparatus comprises a control means, the control means being operable to control movement of the load bearing means (2, 102).

17. A wind turbine apparatus (1) as claimed in claim 1, wherein the load bearing means (2) comprises an adaptable utility apparatus (5), and wherein the adaptable utility apparatus (5) comprises a yaw brake engagement tool, the yaw brake engagement tool (8) comprising a plurality of spaced apart prongs (9*a, b*) for engaging a yaw brake caliper.

18. A wind turbine apparatus (101) as claimed in claim 1 wherein the wind turbine apparatus (101) is configured to engage with and to be guided by a guide track (220) and comprising a means (183) for travelling along a guide track (220).

19. A wind turbine apparatus (1, 101) as claimed in claim 1 wherein the wind turbine apparatus is configured to be controlled by an automation system (201).

20. A wind turbine apparatus (101) as claimed in claim 19 wherein the wind turbine apparatus comprises sensors (216) for determining the position of the wind turbine apparatus (101) and component parts thereof relative to the yaw brakes of the wind turbine in which the wind turbine apparatus (101) is installed.

\* \* \* \* \*